US012211062B2

(12) United States Patent
Vieville et al.

(10) Patent No.: US 12,211,062 B2
(45) Date of Patent: *Jan. 28, 2025

(54) SMART PLATFORM COUNTER DISPLAY SYSTEM

(71) Applicant: CONEX DIGITAL LLC, Melville, NY (US)

(72) Inventors: Jean Vieville, Astoria, NY (US); Louis Dupere, Mamaroneck, NY (US); Nicolas Lorin, Stony Brook, NY (US); Waqas Nadeem, Kings Park, NY (US); Deepan Sekar, Long Island City, NY (US)

(73) Assignee: CONEX DIGITAL LLC, Melville, NY (US)

( * ) Notice: Subject to any disclaimer, the term of this patent is extended or adjusted under 35 U.S.C. 154(b) by 995 days.

This patent is subject to a terminal disclaimer.

(21) Appl. No.: 17/099,255

(22) Filed: Nov. 16, 2020

(65) Prior Publication Data

US 2021/0133845 A1    May 6, 2021

Related U.S. Application Data

(63) Continuation of application No. PCT/US2019/032729, filed on May 16, 2019.
(Continued)

(51) Int. Cl.
*G06Q 30/00* (2023.01)
*A47F 9/04* (2006.01)
(Continued)

(52) U.S. Cl.
CPC ......... *G06Q 30/0241* (2013.01); *A47F 9/048* (2013.01); *G06F 16/434* (2019.01);
(Continued)

(58) Field of Classification Search
CPC .. G06Q 30/0601–0645; G06Q 30/0623–0627; G06Q 30/0643; G06F 16/434; G06V 40/161; A47F 9/04–048
See application file for complete search history.

(56) References Cited

U.S. PATENT DOCUMENTS 5,383,111 A    1/1995 Homma et al.
8,036,954 B2   10/2011 Chow
(Continued)

FOREIGN PATENT DOCUMENTS

CN    106782230 A    5/2017
CN    107348753 A    11/2017
(Continued)

OTHER PUBLICATIONS

G. Agnihotram et al., "Combination of Advanced Robotics and Computer Vision for Shelf Analytics in a Retail Store," 2017 International Conference on Information Technology (ICIT), Bhubaneswar, India, 2017, pp. 119-124, doi: 10.1109/ICIT.2017.13. (Year: 2017).*

(Continued)

*Primary Examiner* — Michael Misiaszek
*Assistant Examiner* — Kennedy Gibson-Wynn
(74) *Attorney, Agent, or Firm* — Gottlieb, Rackman & Reisman, PC

(57) ABSTRACT

A smart product display system has a base on which a product can be placed. A product camera mounted to the base is used to image a field of view over the base. Images from the product camera are analyzed to identify products that are placed on the base and to detect when a customer has interacted with a product, such as by lifting it up. When a product interaction is detected, information about the product is presented on a display. The display can be integrated in a riser extending upwardly from the base. A customer (Continued)

camera can be used to capture images of a person in the vicinity of the system. Images from the customer camera can be analyzed to identify an attribute of an imaged person and an output, such as a content display or an alert, generated responsive to the attribute.

26 Claims, 15 Drawing Sheets

Related U.S. Application Data

(60) Provisional application No. 62/672,439, filed on May 16, 2018.

(51) Int. Cl.

| | | |
|---|---|---|
| *G06F 16/432* | (2019.01) | |
| *G06F 18/214* | (2023.01) | |
| *G06N 3/08* | (2023.01) | |
| *G06Q 30/0241* | (2023.01) | |
| *G06Q 30/0601* | (2023.01) | |
| *G06T 7/70* | (2017.01) | |
| *G06V 40/16* | (2022.01) | |
| *H04L 12/18* | (2006.01) | |
| *H04N 23/54* | (2023.01) | |
| *H04N 23/60* | (2023.01) | |
| *H04N 23/90* | (2023.01) | |

(52) U.S. Cl.
CPC ............ *G06F 18/214* (2023.01); *G06N 3/08* (2013.01); *G06Q 30/0623* (2013.01); *G06Q 30/0627* (2013.01); *G06Q 30/0643* (2013.01); *G06T 7/70* (2017.01); *G06V 40/161* (2022.01); *G06V 40/168* (2022.01); *G06V 40/172* (2022.01); *H04L 12/1895* (2013.01); *H04N 23/54* (2023.01); *H04N 23/60* (2023.01); *H04N 23/90* (2023.01)

(56) References Cited

U.S. PATENT DOCUMENTS

| | | | |
|---|---|---|---|
| 9,033,239 B2 | 5/2015 | Winkel | |
| 9,965,799 B2 | 5/2018 | Schiffman et al. | |
| 10,085,571 B2 | 10/2018 | Schiffman et al. | |
| 10,643,270 B1* | 5/2020 | Vieville | G06N 3/04 |
| 11,468,500 B2* | 10/2022 | Roesbery | G06Q 10/06393 |
| 2003/0128274 A1 | 7/2003 | Dunn | |
| 2007/0081955 A1 | 4/2007 | Sopczynski | |
| 2009/0169052 A1 | 7/2009 | Seki et al. | |
| 2010/0191651 A1* | 7/2010 | Irmscher | G08B 13/1427 340/568.1 |
| 2012/0223943 A1 | 9/2012 | Wlliams et al. | |
| 2012/0226586 A1 | 9/2012 | Paul et al. | |
| 2014/0164190 A1* | 6/2014 | Schiffman | G06Q 30/0641 705/27.1 |
| 2015/0019391 A1* | 1/2015 | Kumar | G06Q 10/087 705/28 |
| 2015/0172373 A1 | 6/2015 | Watanabe | |
| 2015/0363758 A1 | 12/2015 | Wu et al. | |
| 2015/0379366 A1 | 12/2015 | Nomura et al. | |
| 2016/0019514 A1 | 1/2016 | Landers, Jr. et al. | |
| 2016/0148292 A1 | 5/2016 | Gupta et al. | |
| 2017/0032349 A1 | 2/2017 | Nishida et al. | |
| 2017/0124603 A1* | 5/2017 | Olson | H04L 67/52 |
| 2017/0161957 A1 | 6/2017 | Yajima et al. | |
| 2017/0257604 A1 | 9/2017 | Fujii et al. | |
| 2019/0215424 A1* | 7/2019 | Adato | G06T 7/521 |
| 2019/0228443 A1* | 7/2019 | McGwire | G06Q 30/0281 |

FOREIGN PATENT DOCUMENTS

| | | | | |
|---|---|---|---|---|
| DE | 202006019429 U1 | 3/2007 | | |
| WO | WO-2020181066 A1 * | 9/2020 | ......... | G06K 9/00624 |

OTHER PUBLICATIONS

Moorthy, Rahul, et al. "Applying image processing for detecting on-shelf availability and product positioning in retail stores." Proceedings of the Third International Symposium on Women in Computing and Informatics. 2015. (Year: 2015).*

Fan, Jian, and Tong Zhang. "Shelf detection via vanishing point and radial projection." 2014 IEEE International Conference on Image Processing (ICIP). IEEE, 2014. (Year: 2014).*

ISA/US, PCT International Search Report and Written Opinion mailed Jul. 24, 2019 issued in PCT International Application No. PCT/US2019/032729.

Tangible Display, "Tangible Retail" product presentation, www.tangibledisplay.com/wp-content/uploads/TangibleRetail_by_TangibleDisplay.pdf, last retrieved on May 7, 2018.

Article, "Wal-mart stores seeks patent for computer vision product recognition"; Published (2016, May 26). Global IP News, Software Patent News Retrieved from http://dialog.proquest.com/professional/docview/1791369342?accountid=161862.

* cited by examiner

SMART PLATFORM COUNTER DISPLAY SYSTEM

CROSS-REFERENCE TO RELATED APPLICATIONS

This application is a continuation application of PCT Application No. PCT/US19/32729, filed on May 16, 2019, which claims priority to U.S. Patent Application No. 62/672,439, filed May 16, 2018, the entire contents of which is expressly incorporated by reference. This application is also related to U.S. patent application Ser. No. 16/719,523, filed Dec. 18, 2019, now U.S. Pat. No. 10,643,270, issued May 5, 2020, and which is a continuation of PCT Application No. PCT/US19/32729.

FIELD OF THE INVENTION

The present invention concerns a merchandise display and information presentation assembly which is able to recognize products through the help of computer vision and artificial intelligence and which is able to respond accordingly in order to display relevant product information to a customer.

BACKGROUND

It is common for stores to display sample products for viewing, examination, and/or testing by a customer and to provide information about those products. In many instances, the display is open and allows the customer to pick up and examine the product. These types of product displays are typical for cosmetics and similar items.

In a conventional display, a customized counter display is prepared to hold a predefined set of products. The products are arranged on an acrylic template, such as a stand, and that typically has cut-outs or pre-printed placement guides into which products can be placed. A printed paper insert or similar graphic element can be provided to fit in or be disposed adjacent to the template for aesthetic reasons and also as a medium on which to present information about the displayed products. When the store updates their product lines, new holder kits often need to be shipped to the store before the change is finalized, a process referred to as a unit update. Also, if the store wants to change the unit graphic material, they often need to send new printed material to change the static visual in the store. More substantive changes may require design of a completely new counter display unit.

An alternative to static information systems is a digital screen which can be used to display product information in an interactive manner. In some systems, products are displayed on one or more shelves or platforms. The products are placed in specified locations according to a predefined planogram. Sensors are used to detect when a customer interacts with a displayed product. For example, an infrared touch frame can be used to detect when an object, such as a product or customer's hand, breaks one or more IR light beams and where this interaction occurred. A camera or other sensor can be used to detect when a customer interacts with an item on display. When such user interaction is detected, information about the particular product assigned to the location of the interaction can be presented.

Other systems allow more flexible product placement by using an RFID or NFC tag or a printed 1D or 2D bar code on the product so that the product itself can be identified using a tag reader or bar code reader. For example, a customer picking up a product can pass it in front of a reader and the system would then display information according to the product data captured by the reader.

Alternatively, the product can be mounted on a special base with properties that can be used to identify the product. One approach used in the context of infrared frames is to mount the product on a special acrylic puck or podium. Each podium has a unique IR reflection pattern. Infrared emitters are positioned by the product display. When a user interacts with a product, the system identifies the reflection pattern and uses that pattern to determine which product is being moved. In another known solution, a product podium with a unique pattern of magnetic or physical bumps on the bottom is used. The pattern of bumps can be detected when the podium is placed on a touchscreen, such as by detecting changes in magnetic field or altered capacitance.

While adding tags or using specific podiums may allow a product to be reliably identified, such changes impact the visual appeal and aesthetics of a product. They may also be difficult to implement. For example, some products do not have a suitable location to place an easy to scan bar code. Many cosmetics and similar product containers have a lot of metal and this can interfere with the ability to read an RF tag placed on or within the container. In addition, if a sample is lost and needs to be replaced from stock, it may be difficult for a floor sales associate to find the proper tag or bar code sticker and apply it properly, or to locate a correct replacement podium and attach the product to it. The floor sales associate may instead decide to defer replacement of the sample product or might not even not learn that a sample was removed and not replaced by a customer, leaving an empty display which may in turn deter customer inquiry.

Accordingly, there is a need for a smart counter display system that can detect and identify a product placed on a platform base without requiring that the product be placed in a predefined location and without requiring that the product be physically altered, such as by the addition of tags, bar codes or other indicia, or using special bases or reflectors. There is a further need for such a system that can dynamically interact with customers who express an interest in a given displayed product. There is another need for a smart counter display system that will produce alerts when conditions such as a missing display product exist so that they can be quickly remedied.

There is a further need for brand label companies and other companies that market consumer packaged goods to be able to easily track key performance indicators and other data related to product sales and to be able to quickly and easily discern the impact of changes in information presented to customers at a counter display has on sales and interaction by the customer with the products.

DETAILED DESCRIPTION

Figure 1A:
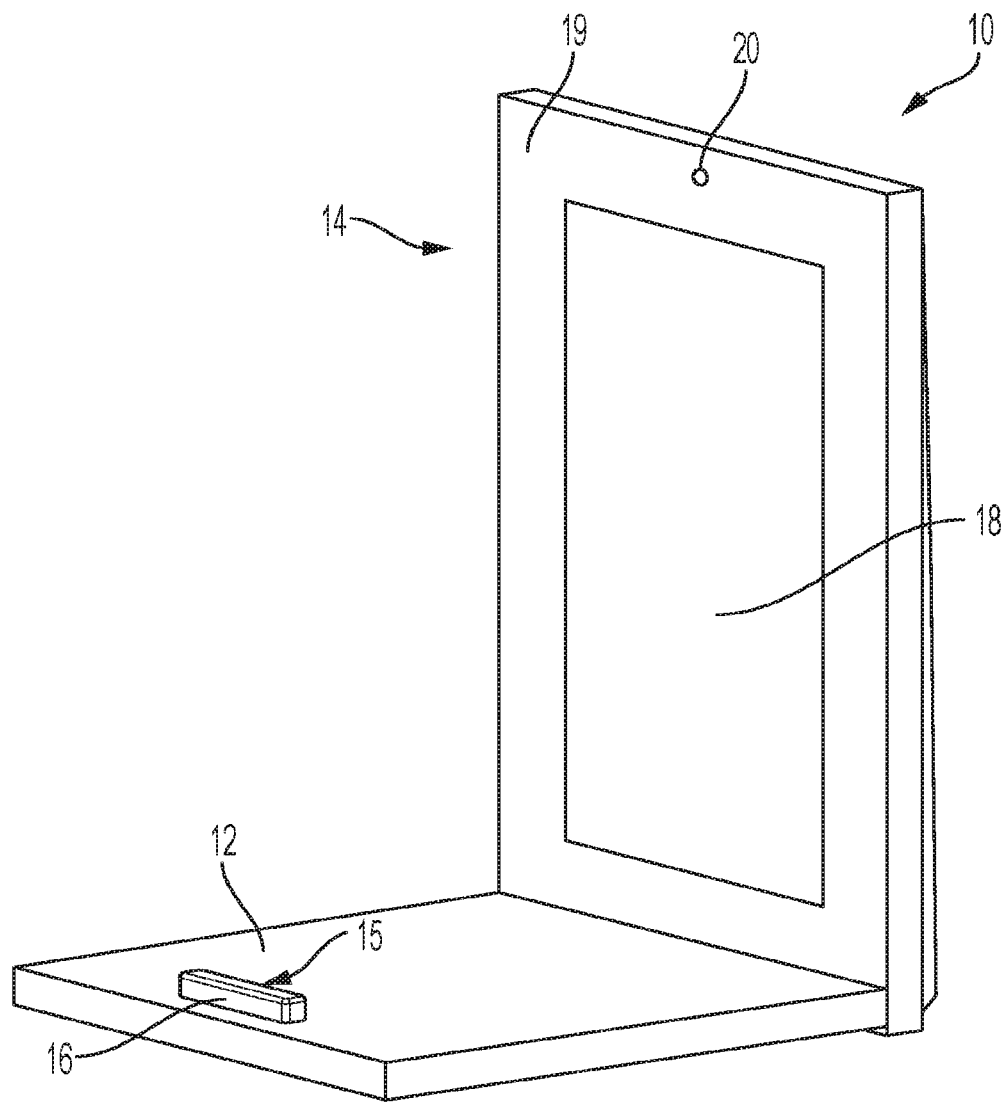
FIGS. 1A and 1B show a smart counter display system according to an embodiment of the invention.
Figure 1B:
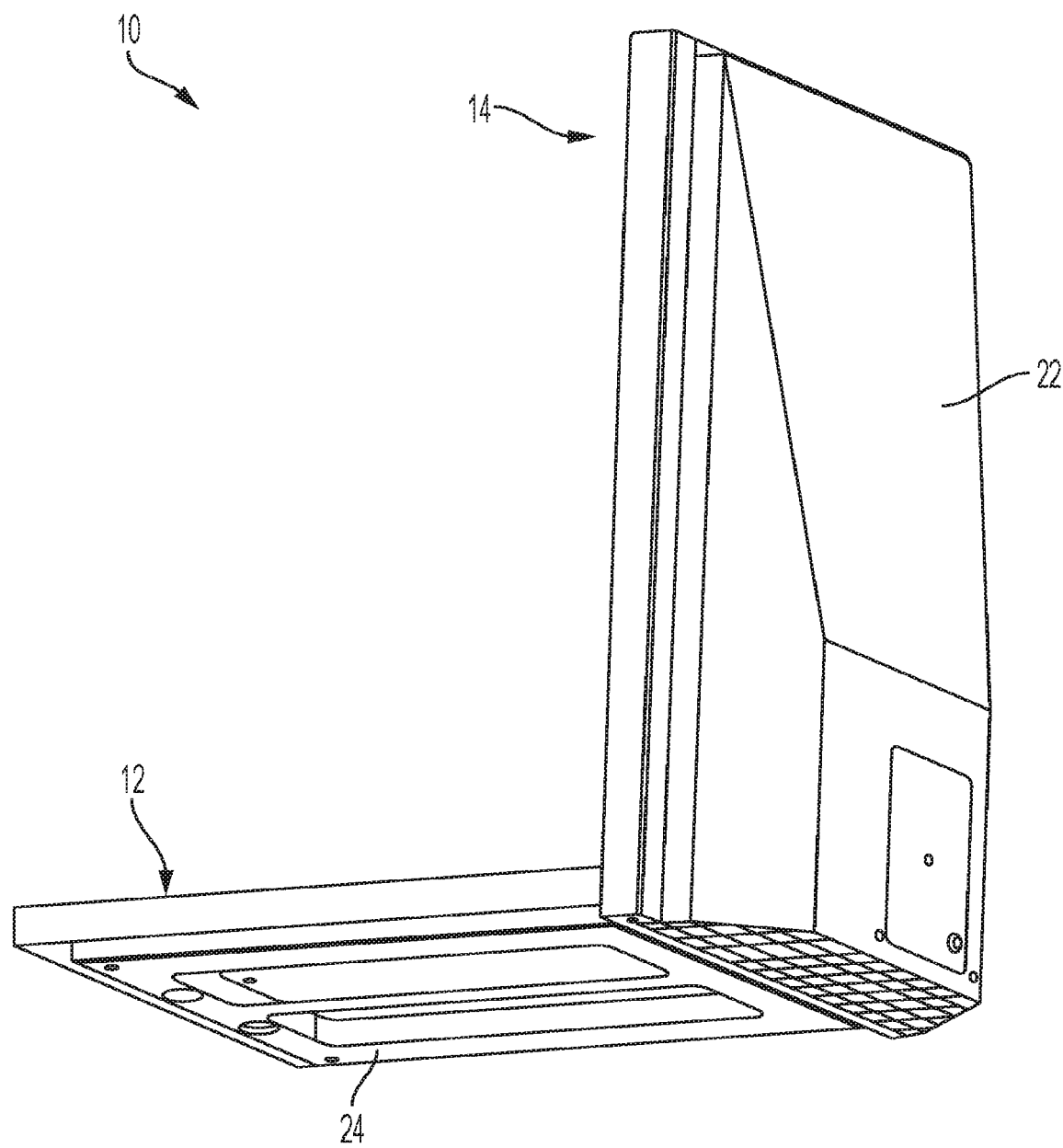

Turning to FIGS. 1A and 1B, there is shown a smart counter display system 10 according to an embodiment of the invention. The system 10 as illustrated comprises a generally flat platform base 12 upon which one or more items, such as samples of makeup, perfume, or other consumer products, can be placed for display. Although a flat platform surface is illustrated, the platform base 12 does not need to be flat, but can have a varying surface contour, such as an undulating or stepped configuration. In this embodiment, a riser 14 is provided with an active display area 18 on which information can be displayed. Preferably, display area 18 is a flat-screen display, such as an LCD, LED or OLED display. It also can be a touch screen display system, such as a capacitive or IR touchscreen.

One or more digital cameras 15 are mounted on the system, such as within a respective camera housing 16 located on platform base 12. Housing 16 functions to protect the camera from accidental damage and reduce the likelihood of dirt or other material getting on and obscuring the camera lens. Housing 16 can also obscure at least part of the camera hardware from view, such as for aesthetic reasons. A clear cover can be placed in front of the camera on the platform-facing side of the housing 16 to provide further protection. In alternative embodiments, the camera 15 can be recessed at least partially within platform base 12 with the lens portion of the camera exposed.

Cameras 15 are used to image the product display area on the platform base 12. Camera 15 is aimed so that its field of view is directed generally so that objects placed on the platform base 12 can be imaged. As discussed below, images from the camera can be captured and analyzed using a trained artificial intelligence (AI) system. The AI system, by itself or in conjunction with additional software modules, is configured to process image data in order to identify particular products placed on the platform base 12 and the location of those products on the platform platform base 12 as well as to identify interaction with such products by a customer. Various aspects of the AI system are discussed further herein.

As shown in FIG. 1A, the system 10 can also have at least one outwardly facing customer camera 20. The camera 20 is preferably directed so that it can capture images of customers in the region of the system 10 and more preferably directed so that when a customer is interacting with products on the platform base 12, at least a portion of the customer is imaged, such as their face and/or upper body, including head and arms. In the illustrated embodiment, the outwardly facing camera 20 is mounted within the frame 19 of the riser 14, preferably towards the top of the unit. Alternatively, camera 20 could be mounted in other positions, such as on top of the riser 14, on its sides or bottom, or even on the surface or sides of the platform base 12. It should also be noted that the product imaging camera 15 could be positioned in other places as well, such as on the riser 14 but aimed towards the platform base 12.

The customer image can be processed, such as by a face analysis or face detection AI system, to identify specific customer attributes. This information can be used in the selection of the information to present on the screen. Customer actions, such as gesturing, movement of hands, leaning over or towards the display, and other actions can also be detected and used as part of the content display triggering process.

In addition to recognizing objects imaged by the camera, imaging data from cameras 15 can also be used to detect certain customer interaction with the object, such as by picking it up or putting it down. In response, the system can initiate the display of information relevant to that product and take other responsive actions. Likewise, image data from the customer camera 20 can also be used as part of the object recognition image analysis.

Advantageously, the display system as described herein allows multiple different products to be freely placed on the platform for display in a variety of positions. Unlike prior art systems that require product placement in predefined locations according to a specified planogram, the system supports a dynamic planogram where products positions are not limited or defined in advance. The system also does not require that the products on display be physically modified by adding a bar code or RFID/NFC tag or by mounting the product on a special base. As a result, products can be placed on display straight from the product packaging by a sales associate. Missing sample products can also be easily replaced. The system provides a great deal of flexibility within the store for selecting which products to put on the platform base 12 for display and in how they are arranged, particularly when using an AI system trained to recognize a large number of different products, such as an entire line of body care, fragrance, makeup or other products, Turning to FIG. 1C, a field of view 28 for a particular camera 15 is illustrated. A sample product 26 is also shown on the base 12. Preferably, the field of view 28 of the one or more cameras 15 is selected so that a given camera can image a large field over the base 12. Preferably, the camera viewing angle is more than 90 degrees in the horizontal and vertical direction, more preferably more than 120 degrees. In a particular configuration, the maximum field of view is limited to 170 degrees to avoid large distortions of the raw image that can make analysis more difficult. However, larger fields of view even up to or beyond 180 degrees could be used in appropriate embodiments. The exemplary field of view 28 will capture at least part of the base in front of the camera 15, the frame surrounding the display 18, and the frame 19 around the display. Some background may also be captured.

Figure 1C:
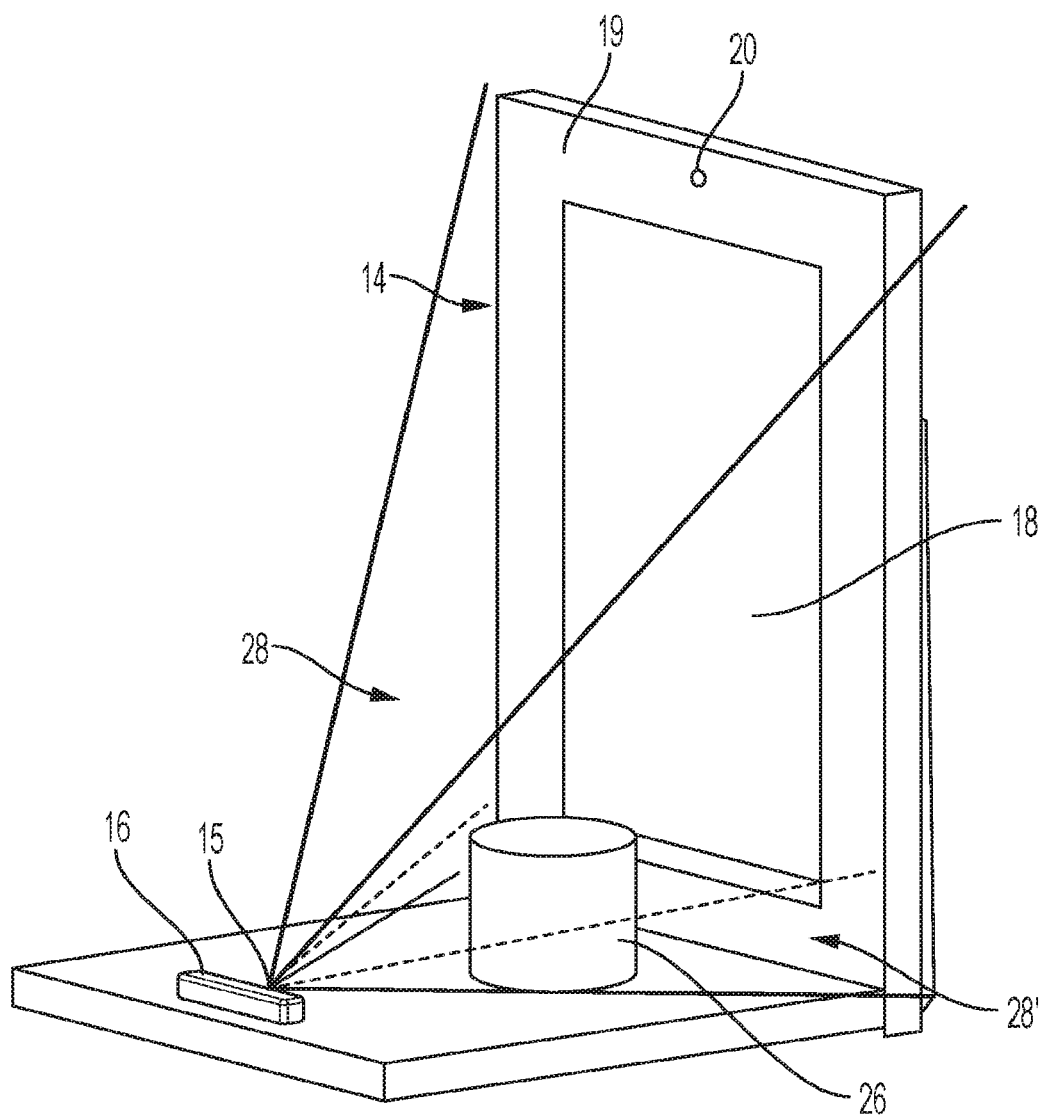
FIG. 1C is an illustration of a field of view of a product camera of FIG. 1A.

In a single camera system, such as in FIGS. 1A-C, a particularly wide field of view may be required to image the complete area on and over the platform base 12. Using two or more cameras will allow for a more complete coverage of the area over the base. Multiple cameras also will permit more accurate identification of products. Viewing the product from multiple sides provides more information that can be used by the AI system. The use of multiple cameras also reduces the problems that may arise when one product on the base obscures the view of a second product from a given camera position.

Figure 2A:
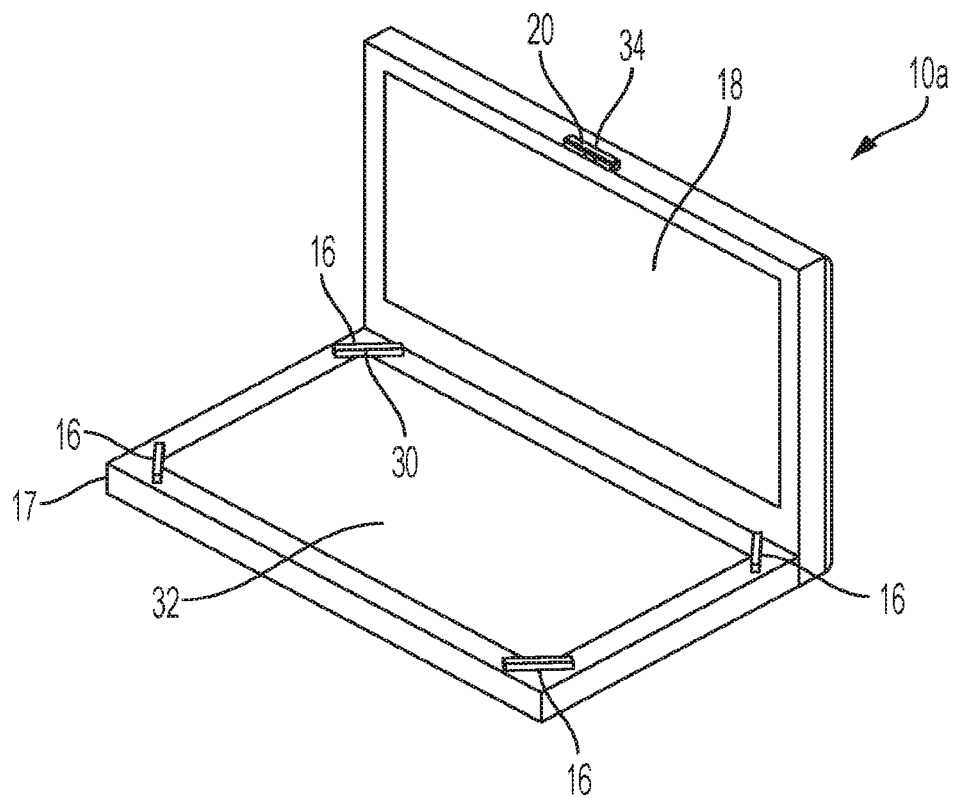
FIGS. 2A-2C show embodiments of a smart counter display system having multiple product cameras.
Figure 2B:
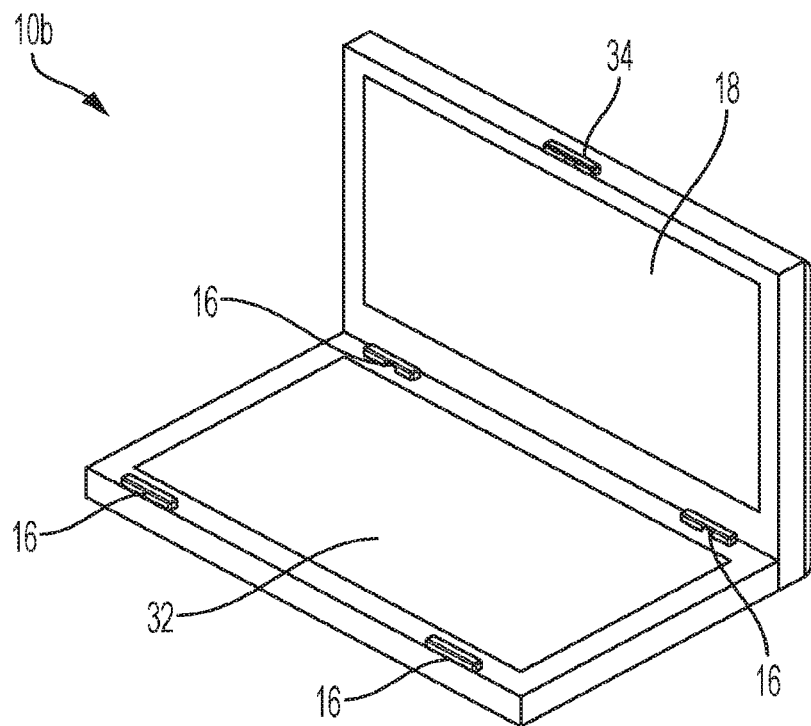
Figure 2C:
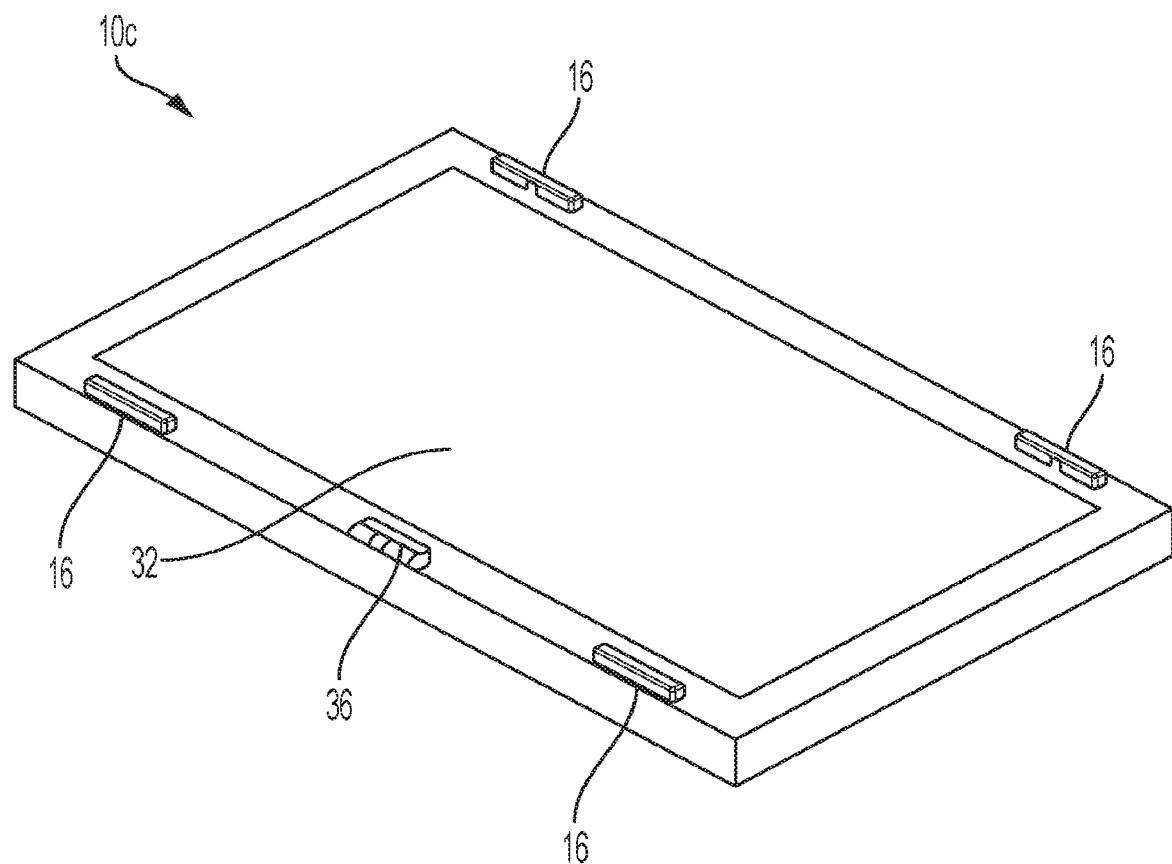

Some configurations having multiple product imaging cameras are shown in FIGS. 2A-2C. In FIG. 2A, system 10*a* has cameras 15 (not shown) in respective housings 16 placed in each corner 17 of the platform base 12. The camera is angled so that the camera lens (behind aperture 30 in housing 16) is directed diagonally across the base. FIG. 2A also shows an outwardly mounted camera 20 in housing 34 placed on the top of riser 14. FIG. 2B shows a system 10*b* similar to system 10*a* but where the camera housings 16 are placed in the corners and aligned with the front and back edges of the platform base 12. The camera 15 within a given housing 16 can be positioned so its field of view is perpendicular to the camera housing. Alternatively, the camera can be offset so that the majority of the area over platform base 12 is in the field of view for one or more cameras.

The use of four cameras, such as in the embodiments of FIG. 2A-C, provides imaging coverage of the entire platform base 12 and the products on it. Provided that the number of items on the platform base 12 is not so large as to completely surround an item, each item will be imaged by at least one camera and recognized by the system. An alternative or additional way to provide multiple views of the products on the base is to provide a mirrored surface on at least a portion the riser 14 (not shown) wherein the mirrored surface is positioned to allow allows cameras 15 aimed towards the riser 14 to capture additional reflected views of products on the base. In addition, product imaging cameras could be further positioned on the riser 14 and aimed downwardly towards the platform base 12.

Even if a product is obscured from the one or more cameras while placed on the base 12, images captured when the product is picked up by a customer can be analyzed and used to determine the product at issue. If the system determines that a user is interacting with an unidentified product, the system can output a message which asks the customer to hold the product in front of the display if they would like more information about it. This will allow the system to obtain additional images of the product so it can be identified.

Although the platform base 12 can be a static surface, in an alternative embodiment, the platform base 12 can include a panel display 32 (see FIG. 2A) on which information can be presented to a user. In such a configuration, a riser 14 with its own display 18 can also be provided but is not necessary. An embodiment without a riser is shown in FIG. 2C. As will be appreciated, product imaging cameras 15/housings 16 can be positioned as desired to image the area over the platform base 12. In addition, an outwardly facing camera can be provided to image customers. In the configuration of FIG. 2C, this camera is contained within a housing 36 mounted along one edge of the base with the camera facing outwardly and upwardly from the platform base 12.

The base and riser can be any appropriate size and shape and can be made of any appropriate material, such as metal, plastic, glass, wood, or composites.

Figure 3A:
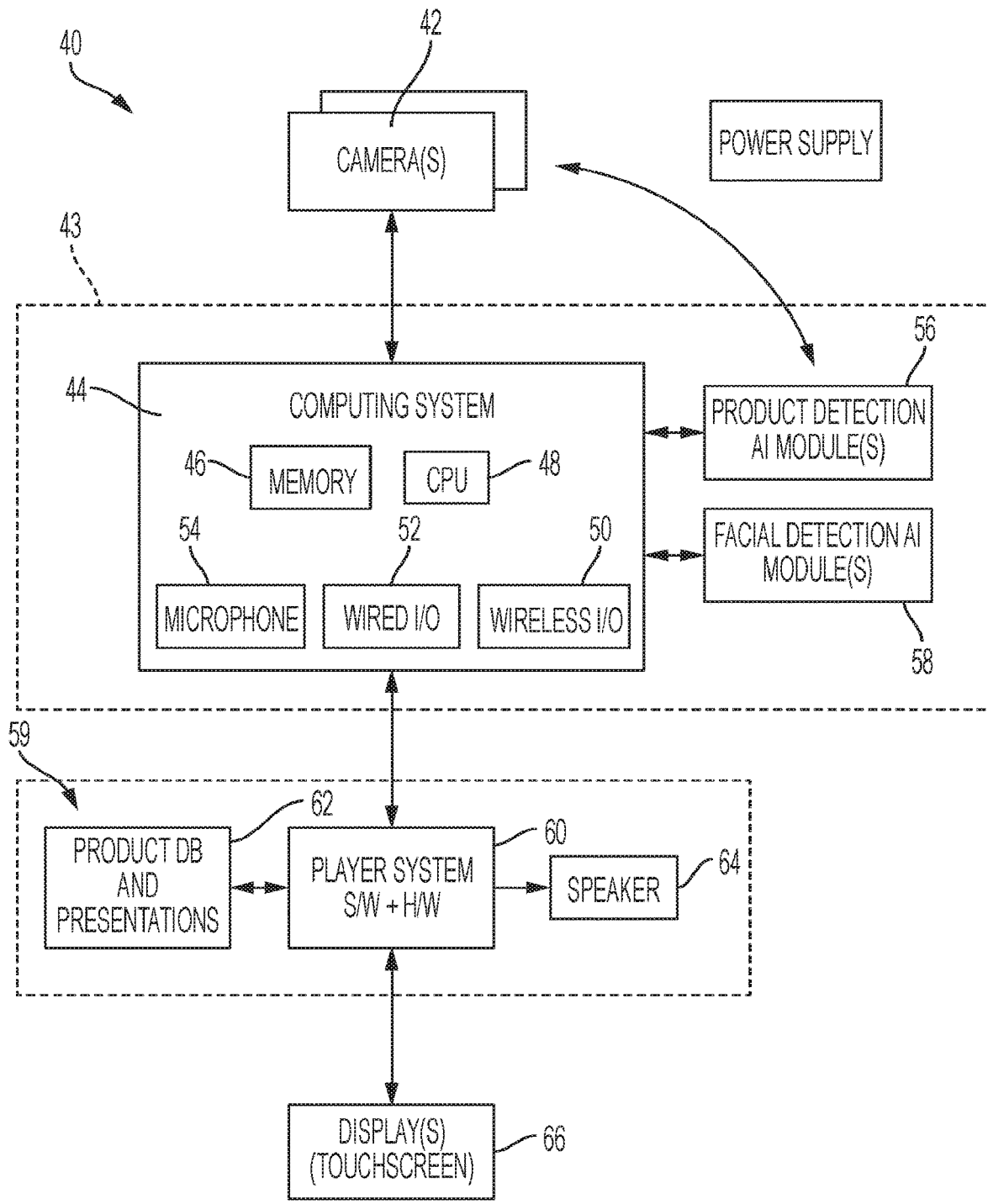
FIGS. 3A-3C show high level block diagrams of showing the major components of a smart counter display system according to embodiments of the invention.

FIG. 3A is a high level block diagram showing the major components of a system 40 according to aspects of the invention. The system 40 has one or more cameras 42, which can be product imaging cameras and customer imaging cameras. The cameras are coupled to the main processing system 43 which comprises hardware and software that will process incoming images to identify specific products on the platform, detect when a person is interacting with one of them, and then provide an indication of this interaction to a player system 59 which can respond to the indication by presenting information relevant to that interaction on the display. The system is not limited to any particular computing platform or operating system.

In this configuration, the system 43 has one or more AI modules, such as product detection AI module(s) 56 and facial detection AI module(s) 58. The AI module is preferably a stand-alone dedicated visual processing system designed for use in computer vision recognition applications, and which has its own VPU (visual processing unit), memory and I/O interface and which is programmed with a deep neural network trained to identify products that may be placed on the platform base 12 as discussed herein. The AI module receives as input the image data and returns an identification of the product or products shown in the image. The AI module can return other data including a confidence level of that product ID along with information about its position on the platform base 12.

The AI module can have an AI chip set on the unit that permits fast and cost effective AI processing do be done. In one example configuration, the AI module comprises a Jetson TX2™ computing device from NVIDIA™ and has a high performance GPU, memory for storing a neural net, AI and other operating software, and standard hardware interfaces. Alternative hardware platforms can be used instead. Facial recognition functionality can also be provided as part of the facial detection module or as a separate module. The neural network used to configure the AI processor to detect objects, faces, etc., can be stored in RAM, firmware, or other memory available to the AI module.

A separate more general computing system 44 can be provided within processing system 43 in order to analyze the output from the AI module(s) 56, 58 and determine whether there is as change in condition, such as a detection of an interaction with a product on the base, which should be conveyed to the player system 59. Computing system 43 can also be used to pre-process image data from the cameras before sending the data to the AI modules for analysis. Alternatively, the camera inputs can be sent directly to the AI modules and the computing system 44 used to process the AI analysis results.

System 43 includes a CPU 48 and memory 46 which stores programs and data. One or more I/O interfaces are provided. A wired I/O 52 is used to connect to other internal devices over conventional data interfaces. It can also include ports, such as USB or Ethernet ports, which allow connection to an external system, e.g., for system programming, updates, or other purposes. A wireless I/O 50 can also be provided and include one or more of a Bluetooth, WiFI, cellular, or other wireless interface. Wireless I/O can be used to send alerts to store personnel as appropriate. The data interfaces (wired or wireless) can also be used to communicate with other display units 10, a local server in the facility, and/or one or more remote servers as will be discussed further herein. Integrated cellular connectivity allows the system to be easily installed in a store or other facility without requiring use of a store's preexisting own internal network. To allow for comparatively low bandwidth and a limited connectivity cellular network to be used as the primary system means of communication, the AI processing should be integrated within a display system. If a sufficiently high bandwidth wired or wireless network is available, AI and other functionality that requires a large amount of image data transfer can be offloaded to a remote system, as discussed further herein.

Computing system 43 also can include a microphone 54 for receiving audio input. Other conventional components can be included as well.

Player system 59 comprises the hardware and software to process messages from the computing system 43, determine appropriate content to display, and then to display that information on the screen 18 or elsewhere. It also can provide an interactive customer interface, such as via a touchscreen, by means of which a customer can request information, respond to questions, etc.

Player system 59 can be comprised of a conventional computer on a board or on a chip. For example, a computer board with a conventional processor, memory, video board, audio I/O, Ethernet, USB, and WiFi interfaces, executing a Windows, Linux, or other standard operating system and containing appropriate processing and presentation program software may be used. The player system 59 can be independent of the computer system 43 or can be integrated within the computer system 43.

A product and presentation database 62 stores presentation information and other data about products which may be displayed to a customer. The data can also be updated locally or remotely over the internet or other data link through a content management system. The updates can be done automatically in the background in a way that is not generally visible to a customer using the system. Presentation and product updates can be stored in memory 62 for future activation as discussed further herein. Remote software application updates may also be provided, along with updates to AI systems in system 43 such as discussed herein.

The player is configured to output its presentation to a display 66. Display 66 can be a conventional touch screen to allow for a customer interactive presentation. One or more separate touch screen circuits may be provided if needed. A speaker 64 can also be provided to permit audio output. Other audio outputs, such as a wired or wireless (e.g., Bluetooth) can be provided for use when a more private experience is desired. The audio output can be used to prompt a customer interacting with the system with various options and instructions, such as providing instructions on how to order the product of interest, asking if a sales associate should be called to the unit, and for other means. Voice recognition inputs can be used in addition to or instead of touch screen prompts.

While the player system 59 is preferably connected to the computing system 43 over a physical interface, a wireless connection can be provided instead, such as when the player system 59 is not integrated within the riser 14 or platform base 12, but instead is in a physically separate unit intended to be placed near the platform base 12.

Figure 3B:
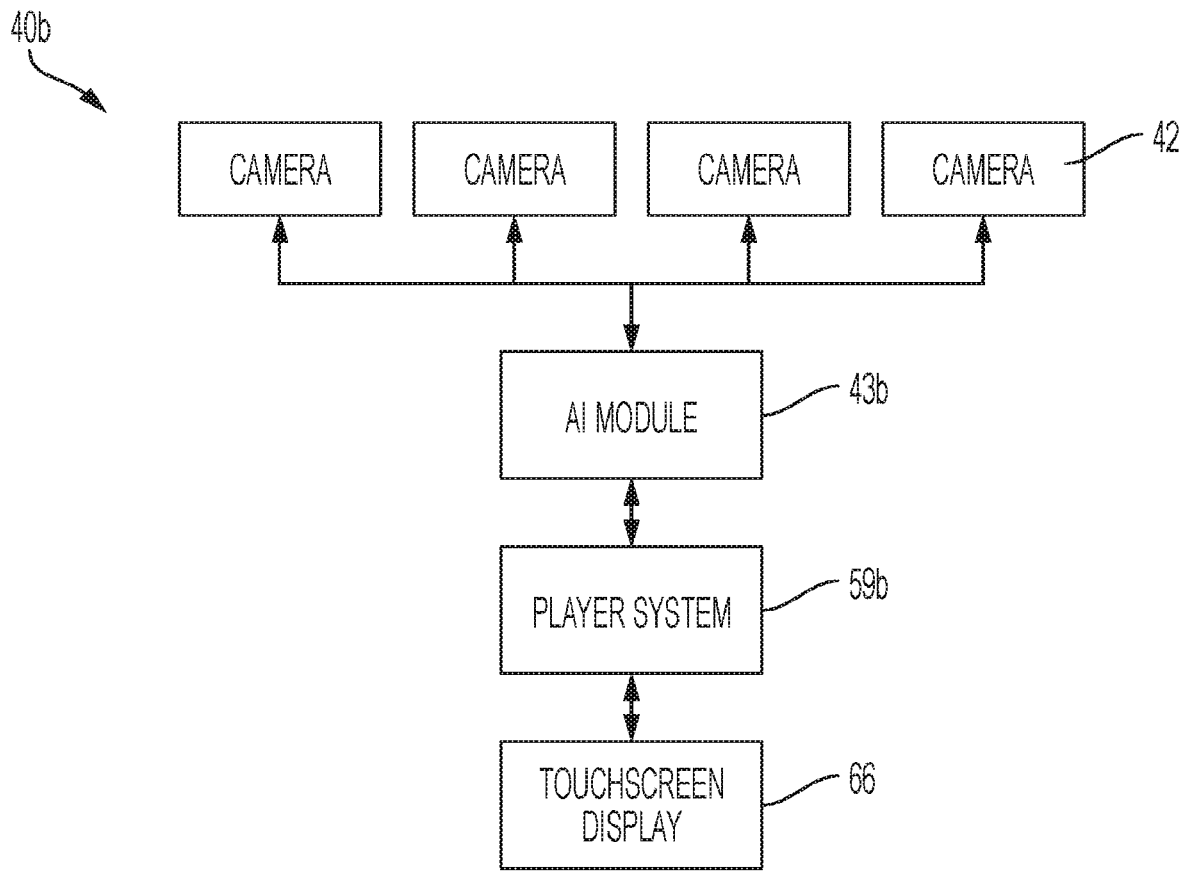
Figure 3C:
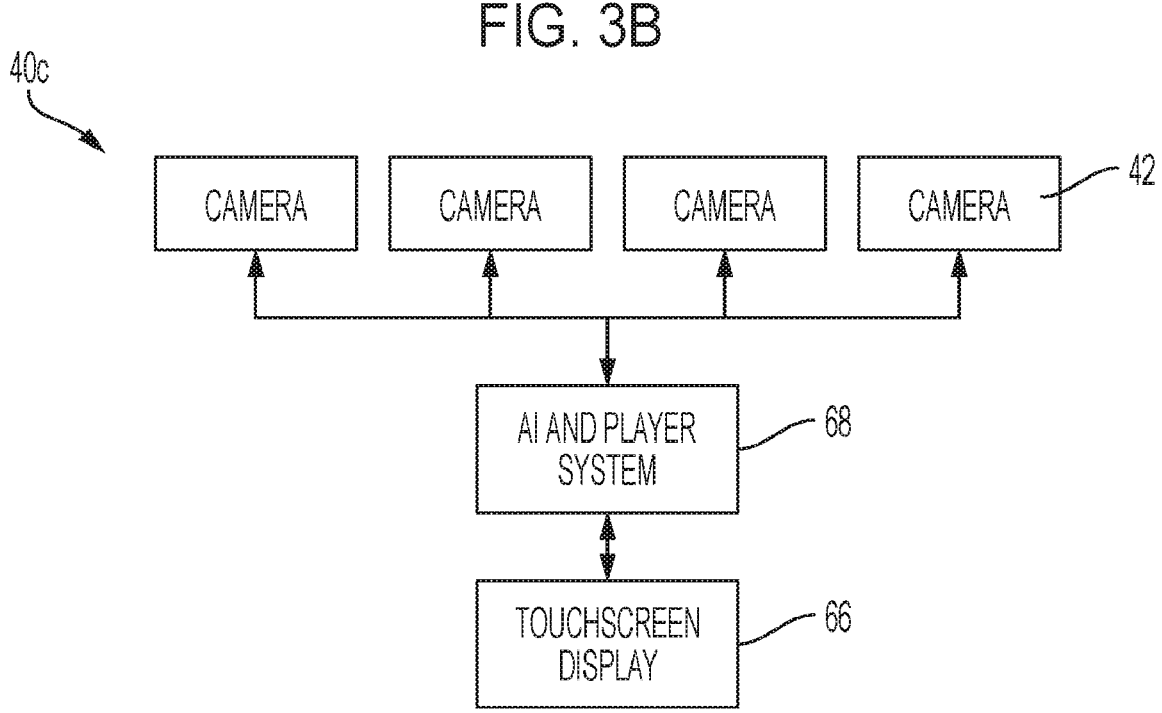

Although the computing system 43, AI systems 56, 58, and player system 59 are shown separately in FIG. 3A, their functionality can be combined into one or more combined computing platforms. For example, FIG. 3B shows system 40*b* in which the image processing functions and analysis are performed on a common computing platform 43*b*. The output of the AI analysis is sent to player system 59*b*, which generally operates as discussed above. Alternatively, analysis of some or all of the AI system output and determination of appropriate responses and alert conditions can be done within the Player system. Player system 59*b* can be comprised of a single conventional computer on a board or on a chip such as discussed above. In a further variation, shown in FIG. 3C, the AI and player system functionality are combined in a single computing platform 68 which drives the touch screen display, detects and processes alert conditions, etc. Software to implement the various functions disclosed herein is stored in one more system computer memories as appropriate. As noted separately, the AI systems can be implemented locally or are accessible remotely via on a separate computer platform accessible via a LAN or WAN network.

Figure 3D:
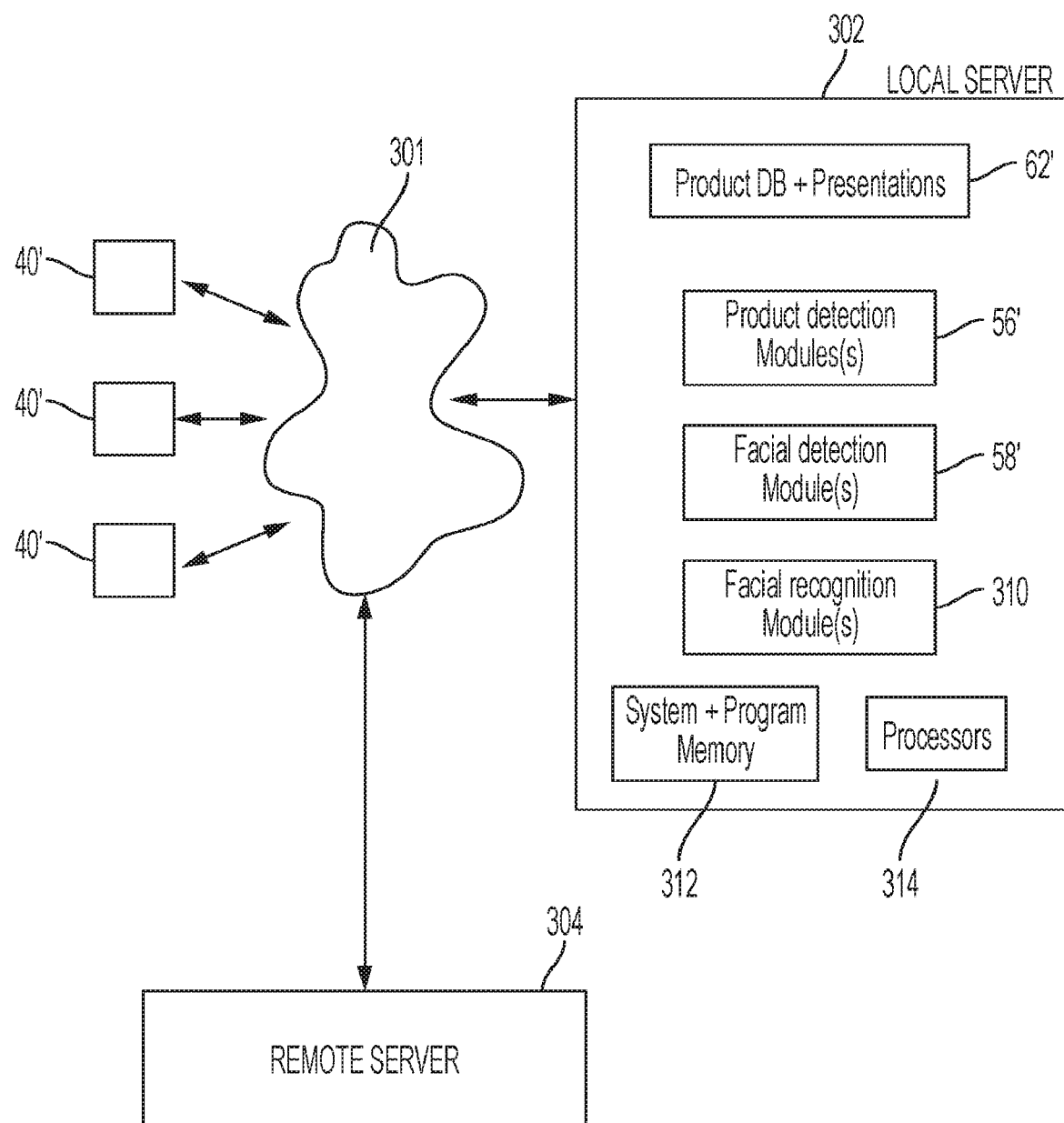
FIG. 3D shows a high level block diagram of a configuration with multiple smart counter display units operating in conjunction with a local and remote server.

In some embodiments, various functionalities that could be implemented in a stand-alone system 40, 40*b*, 40*c*, as discussed above, can instead be off loaded to a remotely located system. FIG. 3D shows a configuration with several systems 40' having various functional modules offloaded to a local server 302, such as a server located in the same store as the display systems 40'. In this configuration, the local server 302 is connected to the systems 40' through one or more networks 301 and comprises conventional features including one or more processors 314 and system and program memory 312. Local server 302 can be used to implement one or more computationally expensive processes, such as product detection module(s) 56' and facial detection module(s) 58'. Connected system 40' can be configured to send captured images to the server 302 and the server 302 processes them and returns the results to the respective system 40'.

The local server can 302 can also include a product database and presentation store 62' containing information relevant to the products to be displayed on one or more of the systems 40'. Because this data is mostly informational, each system 40' can also include at least the portion of the product database and presentations associated with the particular products or product lines assigned to the respective system 40'. These portions can be copied periodically, during an in-store configuration of the system 40', or on demand as updates are available.

Other functions can also be implemented on the local server 302. For example, a facial recognition module 310 can be provided. While facial detection can be implemented locally in a particular system 40', facial recognition may require more computer and data resources than available at the system 40'. Facial images detected by the facial detection module 58 (or 58' if this function is implemented on the local server) are passed to the facial recognition module. Facial recognition data, if any, can then be returned for subsequent processing. Facial detection can be implemented in parallel with other system functions. The systems will forward images of detected faces to the facial recognition module(s) 310 but otherwise be system configured to operate as if no facial recognition is available. This configuration also makes it easier to adjust system operations for use in jurisdictions where use of facial recognition is restricted or barred.

When a positive facial identification occurs, the system can then activate additional functionality, such as communicating with the person using their name, determining based on a user profile that the person may require special treatment, and in response sending an alert to a sales associate indicating who the person is and where they are. A user profile for the determined ID can also be used to select targeted information or advertisements deemed appropriate for that person. Information about past purchases by the individual can be used as a factor in selecting information to display. If the person is associated with a rewards program, discounts or other features associated with the program and relevant to the products being displayed can be shown.

As will be appreciated, the local server 302 will need to respond quickly enough to input received from system 40' to support the interactive features. Thus, the functionality suitable for implementation on local server 302 is dependent on both the speed and bandwidth available over the network connection to the systems 40' and on its own responsiveness.

In a particular configuration, only functions that are not very time sensitive are implemented outside of the system 40'. For example, system 40' contain functions as shown with respect to system 40 in FIG. 3A, while the local server 302 implements facial recognition 310.

One or more features can also be implemented in one or more remote servers 304 connected to the local server 302 by one or more networks 301. The individual systems 40' can also be connected to the remote servers 304, either directly through the networks 301 or via the local server 302. Remote servers can be used to implement more global features such as distribution and update of AI training, back-office data collection and analysis, and some features, such as facial recognition if desired and the functionality is not available on the local server or individual systems 40'.

Returning to the system configuration 10 as shown in FIGS. 1A-1C that has both a shelf and riser, the majority of the electronics, including the AI and other processing units, can be mounted behind the riser 14 and display 18, such as behind a rear cover 22 (FIG. 1B). The system electronics, such as the computing and imaging processing components, including the high power AI system, can generate a significant amount of heat. Putting the major heat-producing components in the riser limits heating of platform base 12 by the system electronics and helps keep platform base 12, where product samples are located, cool. This can be particularly advantageous when the products displayed are items such as cosmetics and perfume samples, which are best sampled at room temperature and whose quality can be impacted by heating. The type of electronics located underneath 24 the platform base 12 are minimized, preferably to only that needed to connect the cameras to the main computing system and other components to the extent that their use would not result in heating of the platform base 12.

Figure 4:
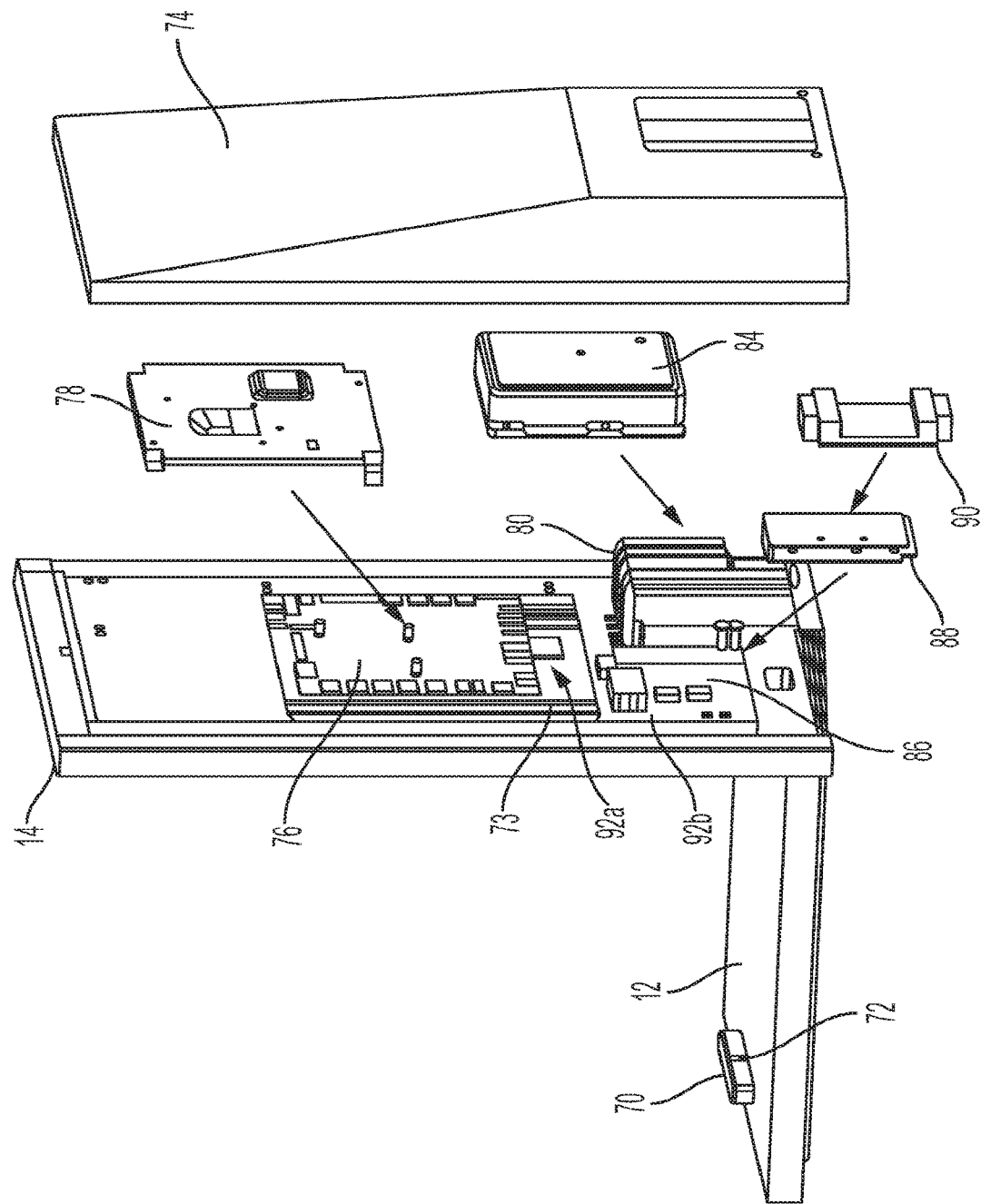
FIG. 4 shows an exploded view of one particular configuration of a smart counter display system such as shown in FIGS. 1A and 1B.

FIG. 4 is an exploded view of one particular configuration of a smart counter display system 10 such as shown in FIGS. 1A and 1B. In this configuration, a product camera 72 is mounted on platform base 12 under housing 70. Other than the camera and connecting wiring to provide power and data connections to the rest of the system, the remaining electronics are all located on the riser 14 and hidden from view, in part or full, by back panel 74. A general computer board and touch panel display circuit 76 is mounted to the riser 14 via mounting rails 73. Appropriate electronic shielding, such as a shielding panel 78 is provided to reduce electrical interference. The AI module comprises the AI processor board 88 and associated carrier board 86 which provide various I/O and other support functions. A large heat sink 90 is provided to assist in cooling. Appropriate shielding for the AI module is also provided. One or more RF antennas are mounted within antenna holder 80 under cover 84 and connected to a WiFi and/or Bluetooth module, which can be part of circuit 76.

Data interfaces 92a and 92b comprise Ethernet and/or USB ports and allow connection of internal and external devices. In one embodiment, at least one USB or Ethernet connection is positioned to be easily accessible when panel 74 is removed and the system can be programmed and updated via this mechanism. At least one port could also be made accessible without requiring that panel 74 be removed. While this configuration is designed to use passive cooling, an internal fan or other active cooling elements can be provided as well. A power input jack (not shown) can also be provided on the rear of the system 10, preferably near one of the bottom corners.

In a configuration such as system 10C of FIG. 2C that has no riser, the system electronics can be put into a separate housing that is connected by a cable to the cameras and other components in the platform. Alternatively, some or all of the system electronics can be put under the platform base 12 with means provided to limit heating of the platform base 12 by the underlying electronics. Various heat removal systems can be used. For example, a passive cooling system can be provided. Heat pipes and other radiating units can be used to direct internal heat to the outer edge, preferably back edge, of the platform base 12. Insulation can be used between the electronics and the underside of the top of platform base 12. Active cooling systems, such as fans, could alternatively be used.

Figure 5:
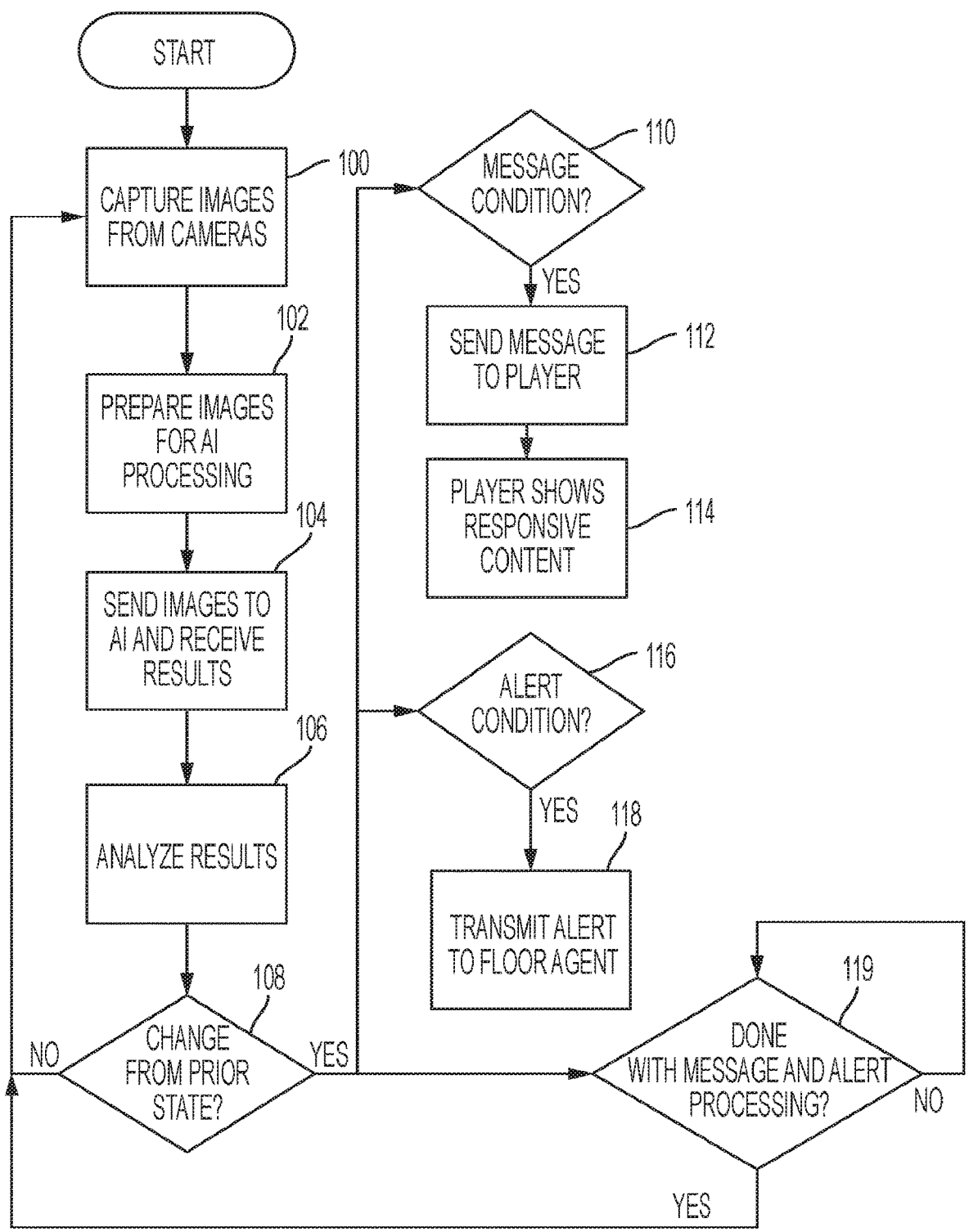
FIG. 5 is a flowchart showing a high level sequence of operation of a smart counter display system in an embodiment of the invention.

FIG. 5 is a flowchart showing a high level sequence of operation of a system 10. As addressed above, the disclosed system is configured to recognize if products are present or missing from the platform base 12 without requiring any modification of the products themselves. First, images are captured by one or more cameras. (Step 100). During image capture, the camera parameters, such as gain, exposure time, etc. may need to be adjusted to compensate for variations in lighting. Depending on the camera system used, firmware in the camera itself may automatically adjust the image capture parameters. Preferably, the cameras are also configured to preprocess wide angle camera images to remove or reduce distortion. This preprocessing reduces load on the main computer. Other processing to adjust image brightness, saturation, color contrast, gamma value, etc., can also be done to improve image quality and compensate for light changes.

The images are then further prepared and processed as may be needed to prepare them for submission to the AI system (Step 102). Various preparation and preprocessing can be done and may be appropriate for the particular AI system in use. Images from each camera taken at the same time can be grouped together in a batch or a combined into a single image that contains each relevant camera view and sent for processing by the AI system in one shot. Other pre-processing can be done as well. The images are then sent to the AI module(s) for processing. The AI system processes the images and returns the results of the analysis. (Step 104).

Figure 6:
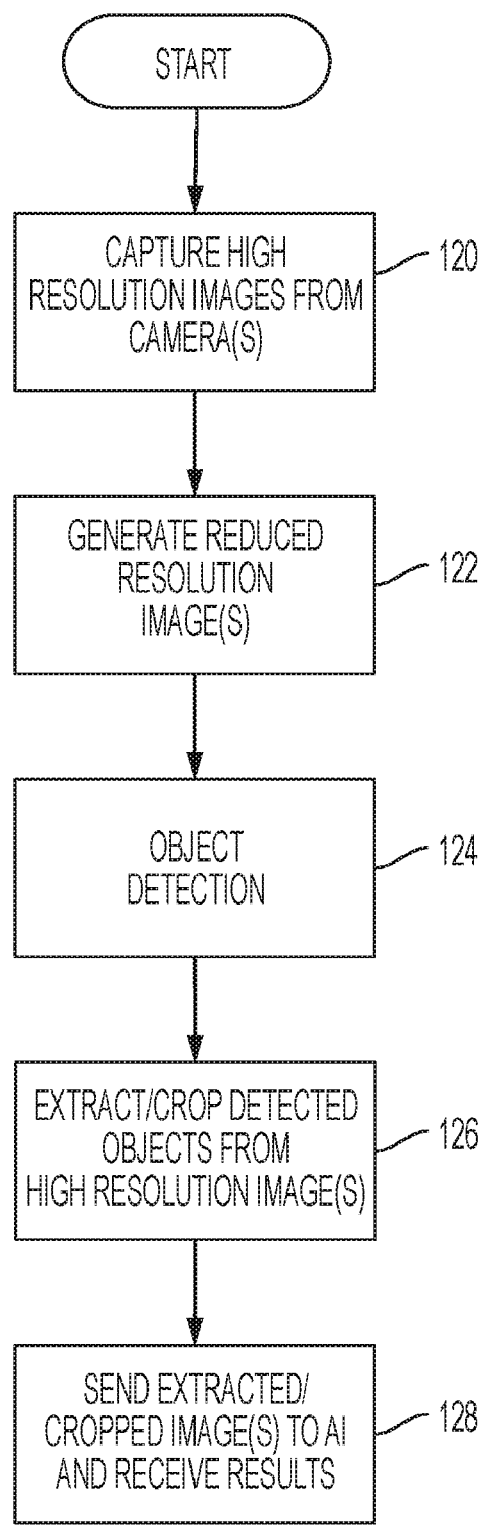
FIG. 6 is a flowchart showing a high level image pre-processing method.

FIG. 6 discloses a multi-step image pre-processing method that can be applied to help improve accuracy of product identification. Initially, high resolution images are captured from the cameras (Step 120), such as at a resolution of 1080p or 4K. The brightness of each image can be normalized so that each image has a predetermined mean, median or other measure of brightness considered to be 'normal' or for a typical illumination scenario. (Step 121) For example, if the unit is sitting in bright sunlight or a very dark shadow, the brightness levels are adjusted to the predetermined measure. Normalization reduces the variance in data significantly and thus allows for a more efficient and/or accurate processing by the system.

Larger resolution images generally take longer to process as compared to smaller ones. High resolution images may be too large or unnecessary for certain downstream processing steps. If so, reduced resolution image(s) can be generated using conventional techniques (Step 122). For example, depending on implementation and camera details, the size of one or more images may be reduced, e.g., from 1080p to 512×512p, using conventional techniques.

An object detection process is executed (step 124), and can be applied to the reduced resolution images in order to identify the areas which contain or may contain products. This step is considered an object recognition phase and generally will employ bounding boxes, edge detection, and other means to locate detected objects in the image. This phase can also identify the generic class of the objects shown, such as a bottle, squeeze tube, pan or jar. Conventional image processing techniques can be used. This step can also include facial detection, although separate software routines optimized to locate faces may be used instead of routines designed to identify various products of interest.

Although preprocessing is discussed separately from the AI processing to detect and identify objects, faces, etc., some preprocessing can also be implemented in the AI system as well or in a separate pre-preprocessing neural network.

The locations for at least objects of potential interest are then translated to corresponding locations in the high resolution image (as needed) and the high resolution image of the detected object extracted. (Step 126). The high resolution image can be sent to a second trained neural network (run on the same VPU as the first network or a second VPU) for classification analysis in order to determine the identity of the imaged product. The low resolution images can be used to determine the general location of the object on the platform platform base 12. (Step 128). Similar processing techniques can be used to identify and extract a picture of a customer captured from the outwardly facing camera. If multiple products are detected in the low resolution image, the large resolution cropped images can be sent to the VPU in series for identification. Alternatively, the undesired portions of the images can be cropped out. This is particularly useful when there are multiple cameras since a single object may appear in more than one image and the system needs to combine the images so as to determine which portions of interest in different pictures represent the same object. Cropping is discussed further below.

Returning to FIG. 5, the AI system results can provide a product ID for each product shown in the images, a confidence level for the determined product ID and information about where in the image that product is. Various conventional AI image recognition systems can be used. If the AI system has trouble identifying an object, a second trained AI layer can be executed to improve recognition. For example, this AI layer can crop the offending object from the main image and send this image through a classification model which responds with the object label and confidence percentage. This added layer can help increase accuracy of the detection when the object detection AI software is not confident of the product.

In one configuration, the AI system is trained to both identify the product and estimate its placement position on the platform. In another configuration, the AI system identifies what product is imaged and output from the AI system is further analyzed to determine placement. For example, the Product ID and information about the position of the product (s) in the image can be used to determine the position of the product on the platform base 12. If there is only one camera, the physical size of the identified product can be retrieved from a product database. The relative size of the product in the captured image and information about the geometry of the platform, camera position, and field of view can be used to determine how far from the camera the imaged product is. If there are multiple cameras or stereoscopic cameras used, the position of the products can be calculated using a triangulation process based on the known placement of the cameras and the location of the specific product within the various images.

In a further configuration, the display surface 12/32 can comprise a sensor pad that will detect the position of items placed on it. This information can be used in conjunction with collected image data to determine the particular location of objects on the display surface.

In some multi-camera configurations, each camera image is processed by separate AI systems operating in parallel or separate virtual AI processes running on a common parallel computing platform. As AI processes return details of identified objects and detected objects that cannot be identified and the locations of imaged objects are determined, the product identification data generated for each image can be merged to determine the placement and identification of objects in the field of view from images taken at the same or substantially the same time. In a similar configuration, multiple AI modules are available and can be dynamically assigned to process images from one or more cameras as needed. The computing system 44 can be configured to track the load of the various AI modules to determine which are available and when and to also decide which camera images receive greater priority.

In addition to identification of objects, images, such as from an outwardly facing camera 20 can also be processed to identify and capture images of customers. Those images can also be processed and sent to the AI system as well. As noted, different AI systems may be used for processing product images and customer images. The customer image processing AI preferably returns characteristics about the imaged customer that may be relevant to selecting what information to present on the display. Possible characteristics that the AI system can try to identify include various physical characteristics such as a general age range (child, adult, etc.), sex, emotional state, and other factors. A further characteristic that the system may indicate is the distance of the person from the system 10. This can be extrapolated, for example, by comparing the size of the face in the image to an average facial size, either in general or more specifically for a person having one or more of the physical characteristics identified. If a stereoscopic or more than one outwardly facing camera 20 is used, distance from the system 10 can be calculated with reference to determined parallax. An open source or commercially available facial detection, recognition and analysis AI system can be used for this process. If a person facing the system 10 is detected at less than a minimum distance, this condition can be used to trigger display and other activity.

In addition to such general customer analysis, customer facial ID recognition can also be performed by an appropriate facial recognition system. For example, a database with pictures of VIP customers can be maintained at a local or remote server (or within the system 10 itself). Alternatively, or in addition, the system can process images of customers interacting with a given display system 10 and assign a temporary ID. This information can then be stored locally, on a separate server, or provided to other display systems 10. Even if a specific ID is unknown, the temporary ID can be used to determine, for example, when the same individual has visited one display system 10 several times or a series of different display systems 10 within a given period of time. Such a condition can be used in determining information to present on the display or for other purposes. The general characteristics, or more specific characteristic of a particular detected ID and info associated with that can also be used to trigger various alerts.

Returning to FIG. 5, information returned from the AI systems is analyzed to determine if the current state of products on the platform base 12 is the same as the prior analysis. (Step 106). If no change is detected (step 108), the system returns to image capture and analysis (step 100 etc.). If a change is detected, the system proceeds. Preferably, the system makes sure that a detected change persists for more than one cycle of image capture and analysis (step 109), such as 2 or 3 cycles or more.

The change is analyzed to determine if a message condition exists (step 110) that warrants sending a message to the player (step 112), which would then show responsive content (step 114). The content display can be presented on a touch-screen and the display program configured to allow a customer to interact with the presentation using the touch screen, e.g., to request more specific information, such as a video describing or explaining how to use a given product, or to ask that a sales representative be called.

In addition to responding to image data and touch screen input, the system can also be coupled with a voice recognition/voice assistant system that will ask question or give answers concerning the product that the customer may have interest in. For example, the system can output an audio query asking if the customer wants more information about a product following a "lift and learn" action, where a customer lifts a product up, or a "place and learn" action, where a customer places a product onto the base 12.

If the customer responds by saying yes, more information could be displayed or a sales associate should be called. Other interactions are also contemplated.

Various types of changes can be defined and detected, including whether a specific product has been added to the platform, moved from one position on the platform to another, or removed from the platform. Various changed conditions can be used to trigger a message to the presentation system and in response to which the displayed information may be changed. Preferably, the system requires that the confidence level provided by the AI system exceed a given threshold before considering whether a change should trigger a message condition. In addition, changes over time can be combined to identify an extended change and identify additional message that may be sent. For example, the system can keep track of which products that have been identified as being removed were previously on the platform within a given window of time, such as 1, 5, or 10 minutes previously.

In a particular example, the system detects that a particular product A has been removed from the platform base 12 and sends a product removal message to the player identifying product A. The player can then display content for product A. If the system detects that a product B has been placed on the base, it can send a product placement message to the player identifying product B. The player can then display content for product B if the product is newly placed on the base. If product B has recently been picked up and information about product B is already being displayed, the player can stop showing the product B information when the product is put back on the base.

The system can also respond in a more complex manner so that the player can dynamically adjust its visual content based on the specific products on the platform at any given time. For example, a counter display may start with three products on it: products A, B and C. When these products are first placed, the player may detect their addition as a change and cycle through displaying information about the three products or display more general information about the product line as a whole. If the system detects that product A is removed from its location at time T1 and product B removed from its location at time T2, the changes would be detected. This condition can occur when a customer picks up product A and then product B. The player can respond by presenting information for both products A and B. If product A is replaced at time T3, the system will detect that change and the player respond by continuing to present information on product B, but no longer for product A.

As will be appreciated, a variety of simple and more sophisticated rule-based display activities can be defined based on information about a present and prior detected changes. As will be further appreciated, because the system does not require products to be placed in specific predefined locations on the base, the system can dynamically adapt if the customer places product B in the place that product A was taken from and visa-versa.

Although the system does not require that products be placed in a specific location, knowledge that products should be placed in one or more particular locations on the base can be used in the decision process in order to decide if a particular product has been removed and/or when to trigger a message to the player. The product home positions can be predefined. Alternatively, the system can dynamically identify 'home' positions when products have been at that location for an extended period of time, e.g., a dynamic planogram.

In one technique, the system first determines if a product is actually located in a home position on the base. If a product is in a home position, the message condition processing can continue. In a simple example, a message decision may require an accuracy score of >0.8 to proceed. A Boolean value (Boolean home position or BHP) is defined to reflect whether a product is detected in a home position. In one configuration, a product function F(Product) can be defined as being 0.5× (BHP)+0.5× accuracy detected of product as returned from the AI system. Thus, in this example, a messaging threshold of 0.9 will not be crossed unless a product is in a home position (value of 0.5) and the accuracy value of the detection of the product ID is at least 0.8. In another configuration, a product function F(Product) can be based on the BHP, a probability P(obj) that the product is obstructed, and lux value L as detected by the camera or other light sensor. In a specific configuration, F(Product)=BHP*accuracy+(1−BHP)*P(obj)*(1−log (1+x*L), where x is a lux scaling factor. In a particular configuration, x is very small, on the order of $1*10^{-5}$ for standard lux values.

Other alternative methods could also be used to determine if a product is in a home position, such as using IR sensors that are blocked when a product is placed on the base at one of one or more possible home positions.

In addition to product change detection, the system can also collect information about customers near the smart platform system using the outwardly facing camera 20 and the images analyzed by the facial detection AI modules. As noted, that AI system is configured to identify various characteristics about a customer and this data can be used by the player system to further refine the type of information presented. For example, different information may be presented if a customer is identified as a child vs. adult, male or female, etc.

As discussed further below, the system can also determine if an alert condition exists (step 116). If so, an appropriate alert can be transmitted (step 118). When the message and alert condition processing is complete, the system returns to image capture and analysis (step 100 etc.). As will be appreciated, an alert condition may also be triggered by other conditions as well and need not be directly triggered from an image capture and processing. After message and alert processing is complete (step 119), the process can return to an initial image capture state (step 100).

The system can also be configured to identify alert conditions which may require action to be taken, e.g., by a floor sales associate. (Step 116). In a particular embodiment, the alert condition triggers a message which is sent to a remote device, such as a smart watch, cell phone, or tablet computer, department paging system, or other mechanism, and directed to the appropriate person, such as a floor agent working the department where the display system 10 from where the alert was triggered. Alerts can be sent using a Bluetooth link to devices paired with the platform system, by text or other messaging systems, by Wifi, or in other manners depending on implementation. Preferably, the devices to which the alerts are sent run appropriate software to maintain communication with the platform system and respond to received alerts as programmed, such as by issuing an audible or haptic signal, and by presenting information on a device display. In one embodiment, the system 10 is paired with a smart watch or other device of one or more sales associates and alerts are sent to these devices.

In a preferred implementation, alert messages, such as ones that are sent to the smart devices associated with the sales associate(s) assigned to that smart platform, contain information relevant to the alert. Information provided to the sales associate can include details about the specific initiating event, information about particular products that may be implicated, including identification of products being interacted with or recently added or removed, and customer information, including an image of the customer captured with the outwardly facing camera 20. Conventional image processing techniques can be applied to extract a portion of the image that shows the customer or a part thereof, such as his or her head or head an upper torso.

Figure 7:
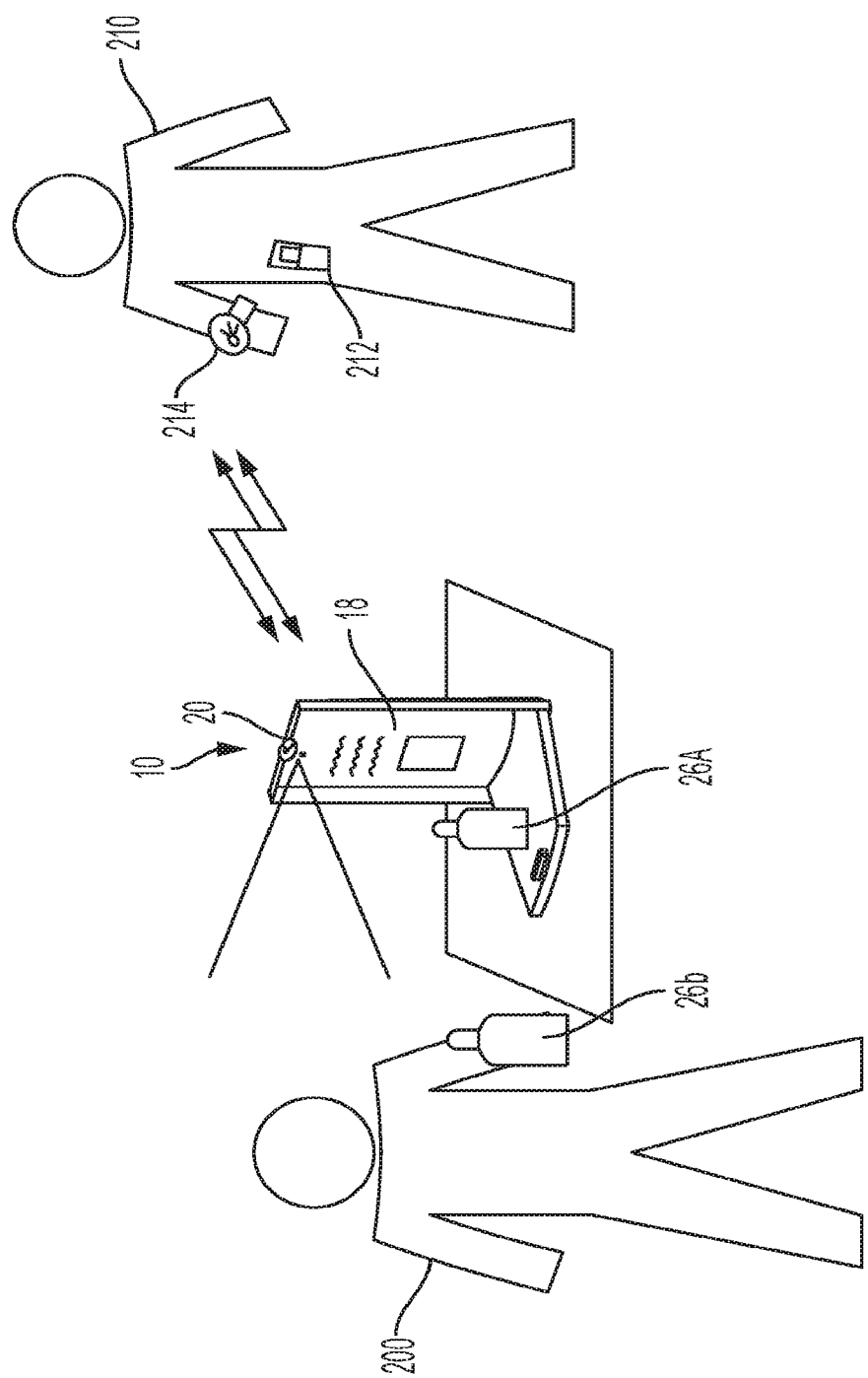
FIG. 7 is an illustration of a smart counter display system according to an embodiment of the invention in a store environment.

FIG. 7 is an illustration of a smart counter display system according to an embodiment of the invention in a store environment. Smart platform system 10 is on display with product 26A on the unit and a customer is holding product 26B. A customer 200 may be interacting with one of the products and relevant information is shown on the display. Outwardly facing camera 20 captures images of the customer 200. An alert message is triggered based on the customer interaction, customer ID, or other factors, and broadcast to one or more floor sales associates 210. The alert can be received by a smart device such as the sales associate's cell phone or tablet 212 and/or smart watch 214. Text and image information concerning the alert can be displayed on the smart device. For example, the identity or location of the platform system in the store and the reason for the alert can be sent. In this manner, the sales associate 210 knows in advance the general nature of the issue that needs to be addressed. If the alert is one that may require interacting with a particular customer (particularly if the alert is triggered by facial analysis), the system can send an image of the customer that may require assistance so that it is easier for the sales associate to find the customer even if the customer wanders away from the counter system. In some jurisdictions, there may be legal restrictions against transmitting facial images of customers without their consent. In such cases, the system can be configured to disable this feature or to obscure the face of the customer.

Returning to FIG. 5, in step 116, various alert conditions can exist. One type of alert is a missing product. This may result from a customer picking up a product from the platform base 12 and putting it down somewhere else or taking it for purchase. When this condition is detected, the system can send an alert to the sales associate that the product is missing and should be replaced. More particularly, the system detects when a specific product has been removed from the platform and has not been replaced within a given timeout period, such as 15 minutes. In response, a missing product alert can be generated. An alert message can then be sent indicating that Product A is missing from that specific smart platform system. An appropriate sales associate receiving the message will then know to bring a new product A for display.

A second general type of alert is an assistance needed alert. Assistance needed alerts can be triggered by various conditions. The customer can press a 'call sales associate' icon on the touch screen. An alert can be generated if the system determines that a given customer has been interacting with platform product for more than a given threshold period of time, such as 5 or 10 minutes. A similar alert can be generated if the face detection AI module indicates that the imaged customer is or may be a VIP customer (based on e.g., facial recognition analysis relative to pictures of VIP customers), has a confused expression on their face, or other triggering facial conditions.

Using facial recognition functionality, the system can also capture images of individuals who are interacting with a given display and assign a temporary ID to that individual. If the system determines that a particular customer has returned to the display platform several times, an alert can be sent to the sales associate with information about the alert condition and other data, such as the product(s) being examined. This allows the sales associate to more easily assist the customer by knowing the customer's likely need in advance. A picture of the customer can also be sent to the sales associate to more easily allow him or her to find the customer.

Other alerts can also be defined. For example, the network can be trained to recognize when a product on display may be empty, such as when a cosmetic is not clearly seen through the side of a jar, or to detect if a sample has been visibly damaged, is marred, or otherwise altered. In response, an alert can be signaled that a sample needs to be replaced. Similarly, the system 10 can be assigned a set of products that are to be placed on it and contain a data record indicating one or more characteristics of the product, such as a list of product ID, product brand, type of product, etc. If a determination is made by the system that an item that does not meet the specified characteristics has been left on the display, an alert can be generated and sent to a sales associate indicating that the item should be removed. For example, a display system 10 can be assigned to display beauty products from a particular brand and contain a record indicating all relevant products of that brand. If the system detects that an object has been left on the shelf that is not in the set of products in the assigned brand (and which might be a beauty product from a different brand, for example), an improper object alert can be generated.

The system can track how many times a given product has been picked up. If it exceeds a specified threshold, an alert can be sent to have a sales associate check to see if the product may need replacement.

A further type of alert is a security alert. Using the outwardly facing customer camera 20 (or other cameras), the system can be configured to automatically detect when someone is tampering with a displayed product or with the display unit 10. In response, an alert can be automatically sent to a sales associate to investigate. Some or all of the video of the event that triggered the alert can also be sent to the sales associate for display on an appropriate receiving device, such as a smart phone. In a particular configuration, when the system detects a security condition, an alert is alternatively or additionally passed to central personnel and relevant video that triggered the security alert is also provided. The video can then be viewed, by itself or perhaps in conjunction with video from other security cameras placed in the facility, to confirm that an issue actually exists. If so, corrective action can be taken.

As can be appreciated, when a display 18 (FIG. 1A) or 32 (FIGS. 2A-2C) is used, text and images shown in the display may be included in captured images if the display is within the field of view of one or more of the cameras 15. This information can interfere with the image analysis system, especially when the display contains pictures of products that may be the same as or different from the products being displayed or pictures or video of people interacting with objects. Various methods are available to reduce this type of interference if the cameras cannot be positioned to avoid it.

The AI system can be trained to recognize when image data is of a computer panel display, and not a real object, and to then ignore that data. If multiple cameras or one or more stereoscopic cameras are used, a depth or triangulation analysis can be used to determine when an imaged product has a position in or beyond the position of the display and this can be used to signal the main program loop that the image of that product should be ignored. In a particular embodiment, this decision is made before the product image is passed to the AI system for recognition. If a stereoscopic image or other multi-view image is available for a particular object, images of an objects on a screen can be distinguished from images of physical objects by determining whether the object has 2D or 3D components.

Another technique which can be used in addition to or in conjunction with the above, is to use a predefined mask that is applied to captured images. Each camera has an associated mask image that defines, for that camera, which regions of the camera's field of view may contain information of interest and which areas may contain images presented on display or objects in the background that may confuse the analysis. For example, white areas in the mask image can represent regions on the unit, like the portion of the platform and frame seen by the camera, while black areas represent regions such as the screen and background.

Figure 8A:
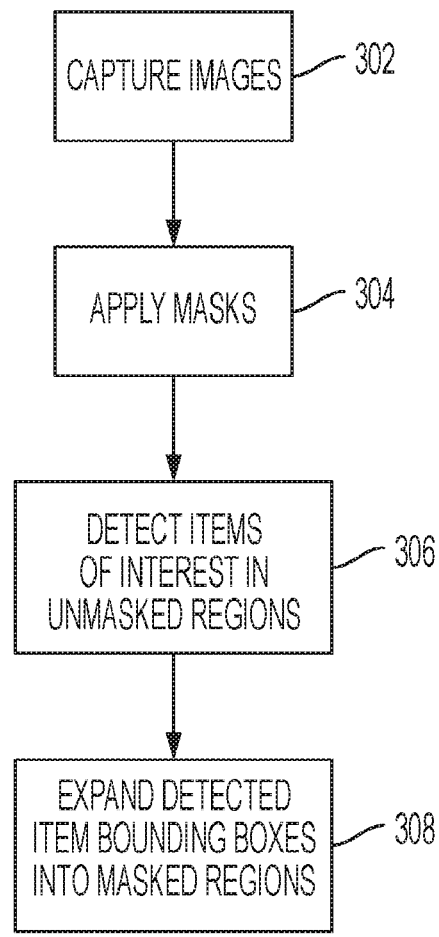
FIGS. 8A and 8B are high level flowcharts showing methods to distinguish images of products placed on a platform from background.

Turning to FIG. 8A, images are captured from the various cameras. (Step 302). The respective mask associated with each camera is applied to the image from that camera (step 304). An item detection process is then executed on the masked images to detect potential items of interest in the unmasked regions. (Step 306; see also FIG. 6 steps 122, 124).

With reference to FIG. 1C, the field of view 28 of camera 15 includes a portion 28' which contains a portion of the platform base 12 and the lower part of the frame 19 on riser 14. This portion does not include background or the display 18 and so the image in portion 28' of the field of view is unaffected by what is shown on the display or what is going on near the system 10. When a physical sample product 26 is placed on the platform base 12, the masked image taken from camera 15 will capture at least the bottom part of the product 26. Because this portion has not been masked off, the system can treat that detection as a real object, and not a false object detection that might occur due to images on the display or activity in the background.

Returning to FIG. 8A, after items of potential interest in unmasked regions are detected, the objects contained in bounding boxes can be expanded into the masked regions (using an image which has not had the mask applied). (Step 308). Various image processing techniques to identify object boundaries can be used.

Figure 8B:
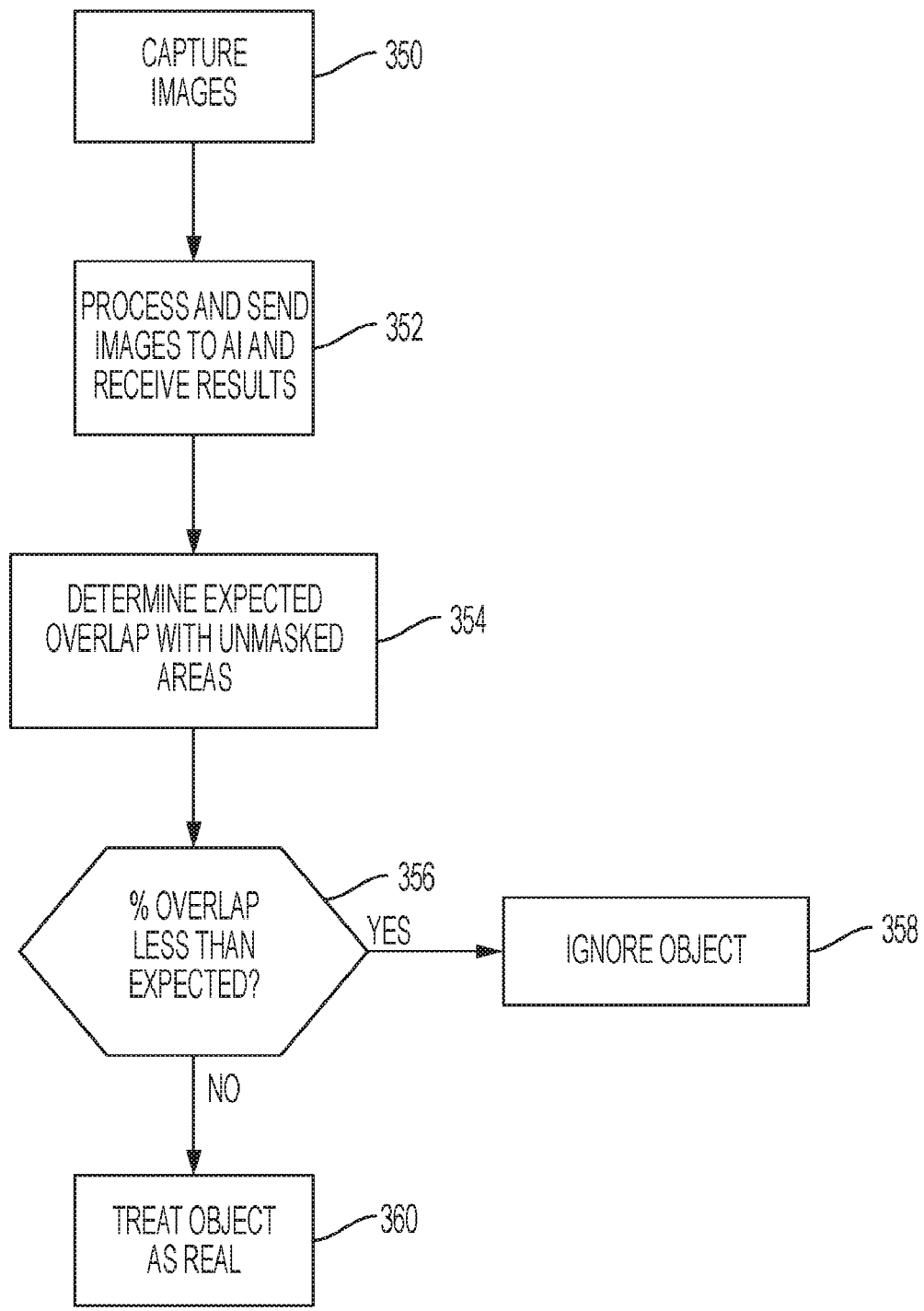

In a variation of this process, and with reference to FIG. 8B, images are captured and unmasked images processed by the AI system to detect and identify items. (Steps 350, 352; also FIG. 5, Steps 100-104). For detected objects at determined locations, the system determines the expected overlap of the identified product at the determined location should have with the platform platform base 12 relative to the actual overlap determined by using the mask. (Step 354). If the actual overlap percentage with the platform is less than expected by more than a predefined amount (step 356), then the product is considered to be on the screen and not placed on the platform base 12 and can be ignored. (Step 358). Otherwise, the identified product is treated as real (step 360) and the processing continues.

There are various ways to generate the appropriate mask files. The mask files can be generated manually by examining images taken from the cameras of a representative display system 10. Because of manufacturing variations, the cameras in display systems 10 having the same overall configuration may still be placed or aimed in slightly different ways. As a result, the mask files suitable for one system may not be accurate for another. Although mask files can be generated manually for each system made, this is very labor intensive.

In an alternative, the mask file generation is done as part of the initial product manufacturing and configuration. After systems 10, etc. are assembled in a factory, there is typically a burn-in testing phase when the units are kept on for a period of time without anything on the platform 12. During this time, the displays on the system 10 (such as display 18 or display 32) are programmed to display various changing images. The images can be random shapes or noise, a selection of sample presentation images representative of what may be shown on the display when used by customers, or other data. If the field of views of the cameras on the system are wide enough to capture the background, one or more background displays are positioned in those areas and a varying background display presented. The captured imagery from the cameras can be analyzed to identify the static portions of the images, which should not be masked, and the changing portions of the images, which can be masked. The determined mask data for the particular camera positions and orientations of that respective system 10 are then stored in a configuration file within the device and can be referenced later.

The imagery captured to generate mask data can be processed to produce the mask in various ways. In one configuration, the images captured by the camera can be processed by the AI system to learn how the unit "looks" through the cameras on the unit. For example, a generally trained AI that is configured for object detection can be further trained for each specific unit during this calibration by processing the test data and indicating that any actual object detection is incorrect. At the end, the AI system will learn which part of the image taken by the camera is a screen, which is the platform, the background table, etc. Once the unit is shipped to a store, it now has this information about itself stored in it. When the unit is turned on, the AI system sees a product (whether on screen or not) and predicts it using the unit-specific mask and other configuration data.

In yet a further configuration, information about the presentation that is being shown on the display screen 18 during active use can be used to help isolate physical objects from objects shown on the screen. During product configuration, test images are shown on the display(s) and images captured by each camera analyzed to determine what portion of the screen display appears in the field of view for the camera and how that screen portion is distorted in the captured image. This information can be used to generate an image transformation that is stored in the product configuration file along with the mask. During operation, information about a current screen display can be provided by player system 60 (FIG. 3A) to the image processing system. The image transformation can be applied to the masked portion of the current screen display image to produce a virtual image that represents what the camera would see on the display if there were no objects in the way. Overlap between the virtual image of the screen generated using the transformation and the actual image captured by the camera represents the areas where the display is not obstructed by an object and the camera is seeing the display itself. This area can then be removed from consideration in subsequent image processing.

As an alternative to digital masking, physical systems can be used to reduce the likelihood that images shown on the display will be incorrectly treated as actual images. A filter, similar to a privacy filter, can be placed on the screen to limit the visibility of the display from the perspective of the cameras. Many types of flat panel display screens, such as LCD displays, are polarized and others screens can have a polarization filter added to them. A polarization filter with a polarizing axis about 90 degrees offset from the screen polarization can be put onto the camera lens to filter out the polarized images from the display. If the screen has a well-defined series of color output frequencies, appropriate interference or other filters can be used to block the colors from the screen while permitting other light frequencies to pass to the camera. Other techniques are also possible. As will be appreciated, if these physical techniques are used, it is preferable that they also be used when the system used to capture product images for training purposes.

Figure 9:
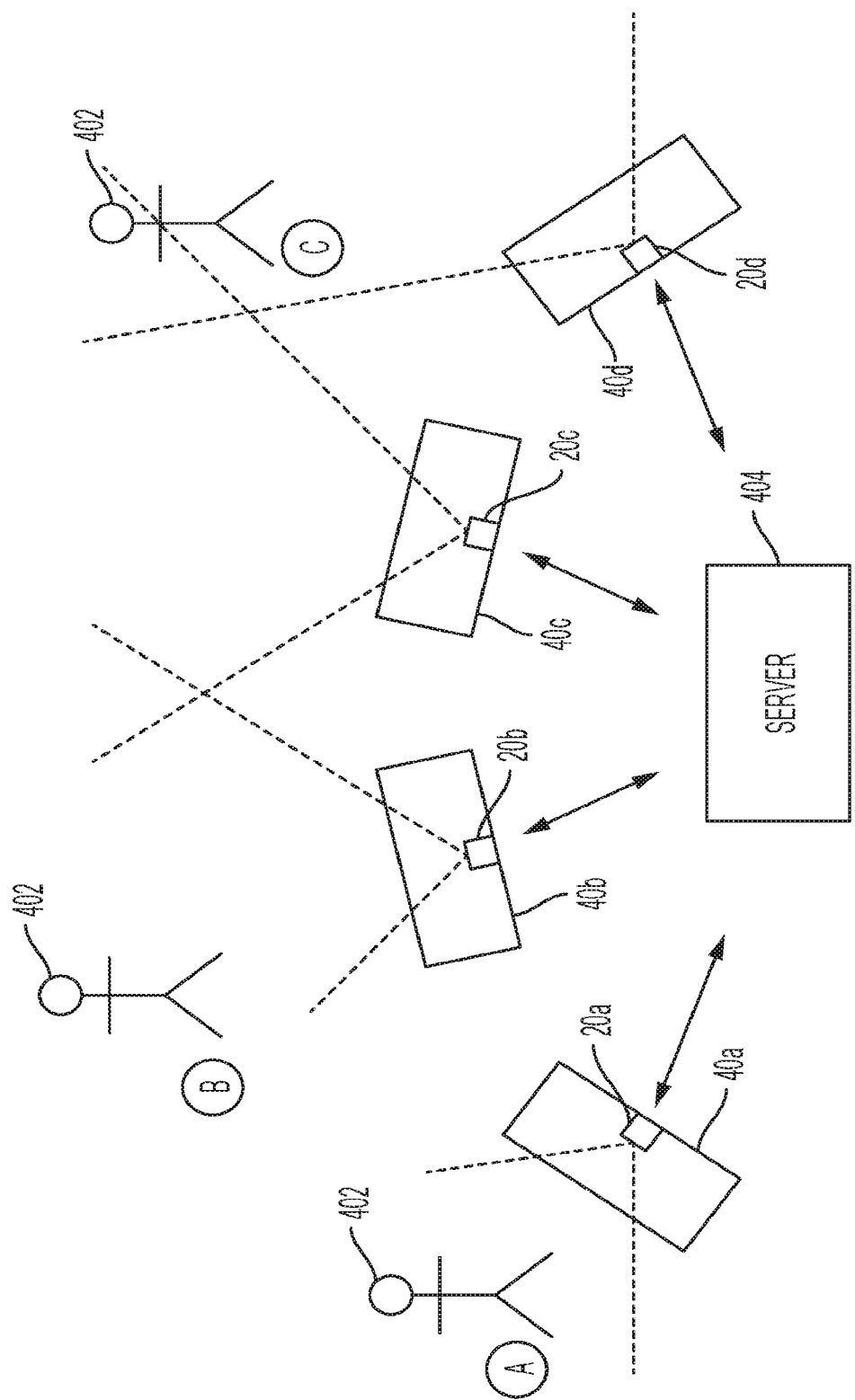
FIG. 9 is a high level block diagram showing a system in which multiple smart counter display units operate in a combined manner.

As noted above, multiple separate display systems 10 can be used in common facility. In a particular configuration, the multiple units can be configured to operate in a coordinated matter between themselves, either through direct communication or by interaction with appropriate software executing on a server. Turning to FIG. 9, an arrangement shows four display systems 40a, 40b, 40c, and 40d connected to a local server 302. The system can be configured to synchronize information displayed on one unit based on the state or interaction with one or more other units. For example, if there are multiple units in close proximity such that the visual display shown on the screen 18 for two or more units can be seen at the same time, a synchronized display presentation can be shown on the units. Each display can be controlled to show the same default presentation at the same time. Alternatively, complementary presentations can be shown.

In response to user interaction at a given display system, the presentation being shown on that unit can be switched to a local presentation that is appropriate for the user interaction. The remaining units can continue to show the default or their presentation can be altered based on the interaction and one or more characteristics of the interacted object. Characteristics can include features such as type of product, color, price, brand, style, model, and other features. By way of example, the display system 40a, 40b, 40c, and 40d can be used to display, respectively, sets of nail polish, eye liner, lipstick, and makeup. If an individual picks up a particular type of nail polish from one display system, this event can be processed by the server 302 and used to trigger an alteration of the output of the other display systems to highlight compatible eye liner, lipstick, and makeup on the other respective screens.

Additional coordination between displays can be based on a facial recognition, whether an absolute ID (based on comparison with a known person, such as a VIP individual) or a temporary ID and facial recognition profile created to allow recognition of a person who is interacting with a display unit. When a person interacts with a first display unit, such as 40a, the particular interaction can be stored in a database linked to the determined ID from the facial recognition system (whether an actual IR or temporary one created for a particular session). When the person is detected in the vicinity of another display unit, such as unit 40b, the content shown on the screen of that other unit can be adjusted based on the prior interaction with unit 40a. Of course, if another person is actually interacting with unit 40b, that interaction can have priority.

In FIG. 9, a person 402 at position A is interacting with display system 40a and is imaged by camera 20a. The image of the person is provide to server 302, which performs a facial recognition. If the person is not identified, a temporary ID is assigned to and stored for at least a limited period of time, such as from a few minutes to a day or more. When the person 402 enters the field of view of a customer camera on another display system, such as when they are at position B within the field of view of camera 20b on display system 40b, the image is captured and sent to server 404. The individual will then be recognized and their ID used to access records of prior interactions. The interaction data is then used to trigger a relevant display on the screen of display system 40b. If the person is imaged by more than one camera, such as when person 402 is at position C in FIG. 9 and is imaged by camera 20c of unit 40c and also camera 20d of unit 40d, the display of both units can be controlled accordingly, such as by the server 404 causing the units 40c and 40d to display the same or synchronized content relevant to the prior interactions. When the person 402 is no longer detected within a given customer camera's field of view, the system can assume the customer also cannot see that display and revert to a different presentation, such as a default presentation. When multiple people are imaged at the same time, the system can alternate between screen presentations relevant to each individual or use other criteria to determine what to show on the screen.

Various other functionalities can be implemented to provide for a more robust, dynamic, and flexible presentation system.

A placement map of the store or other facility can be provided to indicate where each of the display units is located relative to the other and what each unit is assigned to display. Other areas in the store can also be indicated in the map. This information can be used to provide a guides to a customer in one location about how to get to other display units or other areas of the store that may have products of interest.

The system can collect information over time about product interaction, such as which product has been interacted with the most, how long a customer looks at it before returning it to the platform, statistical analysis of product interest based on other products which may be on the platform at the same time, and information shown on the display. This information can be periodically sent from the smart platform display system to a central server using the wireless or a wired data connection. The information can be imported into a database, perhaps with information from other smart platform display systems, and used to generate a human readable information dashboard that can provide product related information to marketing teams, store and brand owners, and others so they can see what is happening in their store and act accordingly. The referenced data can also be linked to sales performance and permit operators to measure the impact of changes made to video or other information presented on a given system 10 in one set of stores relative to other systems 10 in a different set of stores that are presenting the same product line, but with a different version of presentation info used on the systems 10 in those stores.

A voice recognition system can be used to detect the language of an individual in the vicinity of or interacting with a particular display system 10. The audio and video output can be responsively switched to provide information in the appropriate language. Open source voice recognition systems can be used. A limited system that recognizes a small number of words can be implemented locally within display system 10. Remote voice recognition systems, such as available from Microsoft, Google, and others, can be used if a sufficient network connection is available.

If a display system 10 is located in an area, such as an airport duty free shop, that has customers from many different countries, the departure schedule of airlines in the vicinity can be used to determine the destination countries for flights departing within a period of time, such as within 1, 2, or 4 hours. The system can automatically adapt the content displayed in accordance with the destination country. The adaptations can include changing the language and/or currency displayed. Information about the preferences of individuals from relevant countries can be used to select different types of presentations. Thus, a presentation made when a flight to Japan is to start boarding soon (and when many Japanese individuals are likely to be present) could be different than when the flight is to India or Germany. Where multiple destinations are involved, the system can rotate through the various appropriate presentations and/or languages, etc.

Various system components, such as a local server 302, can be linked to a data store that includes information about product stock levels and pricing. Displayed prices can be automatically adjusted as product pricing changes. If a product is over or under stocked, this information can be used to automatically adapt the content displayed to a user. More generally updated brand and marketing strategies can be quickly and easily rolled out to the various display systems.

As noted above, preferably the product detection AI module of the invention is trained in advance on products of interest using various platform camera configurations and under various lighting and placement positions. Various techniques can be used for training. In a particular process, for each product of interest, images are taken of the product at multiple different angles, such as three or more specific angles between the camera and the table (for example at angles of about 0, 45, and 90 degrees). The angles allow isometric projections of the products along these vector orientations to produce a near orthogonal representation of the object in question.

The same set of images is taken at multiple distances, such as near, medium, and far. The near distance is close to the camera for the relevant product definitions and features on the product to be imaged and defined with a high degree of % accuracy and to allow very reliable (and preferably approaching 100%) identification. At a far distance, the product is primarily identifiable by basic features such as the general shape, color, etc. At a medium distance, more features can be detected so that the product can generally be distinguished from the environment but very detailed features are absent.

In each position and angle, images can be taken at multiple different brightness levels. In one configuration, five different brightness levels are used: Darkest, Dark, Medium, Bright, and Brightest. These levels are relative. In a particular implementation, they correspond to brightness levels of 10-100 lux, 100-500 lux, 500-1000 lux, 1000-5000 lux, and 5000-10000 lux, respectively.

Additional training images can be taken of the objects in scenes that may be encountered in real life situations of the products as seen in the existing retail sector, such as being held by a person or with background features that are typical for a store.

In a particular implementation, a training rig is provided to automate the image capture process. The rig is comprised of a half of a dome arc that partially encloses the product and that can be placed. The rig can reposition the product relative to a camera, such as by actuators that move a base on which the product is placed. Various lights are placed in the dome and the system can control brightness and color of the lighting. A background scene can be shown on a display, projected on the back of the dome, or by other means. An additional automated system can be provided that will place a product in the rig for training imaging, and then remove it after image capture is complete and replace it with the next product.

The captured images, which could be brightness normalized first, are then used to train the AI system to recognize the products of interest. Various conventional AI systems and training processes can be used that are known to those of skill in art.

After training for a given display platform model and set of product, the trained neural net data can be stored. The appropriate neural net data can be loaded into a specific counter display system during product configuration at the factory or during on-site installation. The trained AI data, such as neural net configuration or other data, can be manually loaded into an AI neural network within the system, e.g., by connecting to the system through a physical link and uploading the data. The neural net could also be stored on a physical memory device, such as USB memory drive or memory module that is installed in the system.

In an alternative arrangement, the system can be configured to connect to a remote server, such as server 304 (See FIG. 3D), to access and download the neural net data from a remote location. During system initialization, a user can log-in to the remote server using the touchscreen display or another device connected to the smart counter display system. After logging in, the user will be presented with a list of trained networks available to that login and the appropriate one to use is selected. In addition or alternatively, after one or more units are installed in a facility and connected to a suitable data network, an operator can access a website or use a mobile app that gives the operator options to specify where the unit is placed in a facility, such as a store. Based on this, the appropriate neural network data for that unit can be uploaded to it.

The system can also automatically connect to access updated or new trained neural networks as appropriate. Each system can have a unique ID and the neural net data specified for use on that particular system may be downloaded on an as-needed basis. The automated update is particularly useful when smart counter display systems are used for the same product line in multiple stores. For example, if an update is available, a message can be broadcast to each system in those stores that they need to connect to the server and retrieve one or more updated neural net files. The system can also connect on a periodic basis, such as every evening, to check for updates. Various techniques for making updates available on demand or pushing them out to remote devices, either directly or via an intermediate server, are known to those of skill in the art.

According to a further aspect of system updates, a new or updated neural net and/or set of presentation content can be provided to the inventive system in advance of a change in product line, such as new product roll out. The update can be made to the systems in stores before samples of the new product are provided. This allows the roll-out of the updates to be made to many stores ahead of time. The system can be configured to activate the update, e.g., by switching to the new presentation content, when the system detects the new product on the base. This process makes sure that the updated presentation content is not activated until after the new products are physically available in the store. This can reduce and possibly eliminate the likelihood that a presentation is activated too early.

If a transition to an updated neural net is required, it is possible that the system will not properly identify the new product by image processing. In such a case, the transition can be activated by other mechanisms. For example, during a transition, printed product information and training materials can be provided to stores for use by sales agents. A 1D or 2D bar code can be printed on a page with instructions that the page be placed on the platform base. When the system detects the coded indicia, it activates the new content.

A neural network may be trained to recognize all of a company's products, such as its entire family of beauty products. If only a known subset of products will be put onto the platform at any given time, such as only cosmetics or perfumes, or only a particular line of beauty products, information about the product subset at issue can be provided to the smart platform system and used to narrow the scope of products that the AI system considers and thereby improve system accuracy. The product display set (which may include more products than are actually on the platform at any one time) can be identified manually, such as by presenting an appropriate bar code in front of one of the cameras during a smart platform configuration process. The system itself could also dynamically determine the display set by having a user place each of the products on the platform in turn during an initialization or configuration process. The system will then look only for those products even if its net is configured to recognize others.

In a typical arrangement, a company that wants to use the smart counter will provide samples of each product in the product line to be used, possibly by a third party, to train the neural network. The resulting neural net may be trained on dozens, hundreds, or even thousands of products.

In some instances, it may be desirable for a customer to train the system for a particular custom product or add a one-off to the system. Rather than sending a product sample to a remote training location, the active smart platform system of the invention can be used to collect image data that is then used to update the neural network. The update can be limited to one or a small number of presentation systems. The update can be distributed to all systems in a given store or for a given customer, or alternatively, be more widely distributed.

In a particular example, an authorized individual can put a smart platform system into training mode, such as by putting a special bar code on the platform, and then entering a security code into the touchscreen. Information identifying the new product can be entered, for example by placing the product box with its bar code onto the platform to be imaged. After the product has been identified, the system can present a series of instructions to place the product in various locations and orientations on the platform. The various cameras 15 can then be used to capture images of the product at multiple perspectives and locations and perhaps under various lighting conditions. The captured training images and provided product information can then be input to the AI neural network and used to update its training so that it can recognize the new product. Neural network update training can be done overnight using the AI engine(s) within one or more display systems and/or within a local server. If local capacity is not available, or for other reasons such where as human annotations are required, the images can be sent to a remote site for neural network retraining purposes. The updated network can then be uploaded to the relevant display systems.

The images captured from a display platform of the invention can also be used to generate a digital model of the product. This model can then be used to generate multiple simulated images of the product in different locations, with some parts obscured, and at different lighting levels. These artificially generated images can be used as part of the AI training to provide a more robust training process. Default template images can be provided of generically shaped products, such as bottles, boxes, or similar items, at various angles, brightness levels, and distances can be provided to help generate artificial images that more accurately simulate actual product images under different conditions. These template images can be generated by actual imaging of real objects or by artificial means.

Various aspects of the invention have been disclosed and described herein. However, various modifications, additions and alterations may be made by one skilled in the art without departing from the spirit and scope of the invention.

The invention claimed is:

1. A product display system comprising:
    a unit having a base with an upper surface on which a plurality of products can be placed;
    a product camera mounted to the unit and having a field of view that extends over at least a portion of the upper surface of the base;
    a computing system connected to the camera and comprising at least one processor and memory having instructions stored therein which, when executed, configure the computing system to:
    determine based on images from the product camera the presence of a first product set on the upper surface and define for each of the plurality of products a respective dynamic home position on the upper surface, the first product set comprising a plurality of products of different product types, each of the plurality of products being at its respective dynamic home position on the upper surface at a first time (T1);
    determine based on images from the product camera at a subsequent second time (T2) for each of the plurality of products if the respective product is at its dynamic home position on the upper surface; and
    in response to a determination that the first product was present on the upper surface at its dynamic home position and then subsequently removed from its dynamic home position on the base outputting information related to the first product;
    the system further comprising a product detection module configured to determine the presence of products from the first set of products in an input image, wherein the product detection module comprises an AI system with a neural net stored therein and that configures the AI system to recognize images of any of the products in the first set of products.

2. The system of claim 1, the unit further comprising a user output device for outputting at least one of video and audio; the information comprising media content related to a property of the first product and comprising at least one of video and audio content; the instructions configuring the computing system to output the media content on the user output device.

3. The system of claim 2, wherein the user output device comprises a video display in the unit.

4. The system of claim 3, further comprising a riser extending upwardly from the base and having the display therein.

5. The system of claim 4, wherein at least a portion of the computing system is in the riser and the upper surface of the base is not substantially heated by electronic circuitry within the base when the unit is in operation.

6. The system of claim 3, wherein the video display is in the base and is viewable through the upper surface.

7. The system of claim 3, the computing system further configured to output on the video display information related to the first product when the first product is present on the upper surface.

8. The system of claim 7, the computing system further configured to determine location of the first product on the upper surface of the base and wherein content related to the first product shown on the video display panel in the base is output in an area of the display adjacent the location of the first product on the upper surface.

9. The system of claim 2, further comprising content memory having first presentation content stored therein, the first presentation content comprising content related to the first set of products, the information comprising presentation content.

10. The system of claim 9, the content memory having second presentation content stored therein, the second presentation content related to a second set of products, the second set of products including a second product that is not in the first set of products; and the computing system further configured to replace the first presentation content with the second presentation content upon detection of the second product in an image captured by the product camera.

11. The system of claim 2, the instructions further configured to change the media content output on the user output device in response to user input.

12. The system of claim 11, the unit further comprising a microphone, the user input comprises audio input.

13. The system of claim 12, the user output device comprising a touch screen display, the user input comprising touch input on the touch screen display.

14. The system of claim 1, further comprising a central server in communication with the unit;

the instructions further configuring the computing system to generate product interaction data related to the presence and absence of products on the upper surface and to send the product interaction data to the central server.

15. The system of claim 14, wherein the product interaction data comprises data indicating a period of time between detection of the removal of the first product from the upper surface and a subsequent detection of the return of the first product to the upper surface.

16. A system comprising a plurality of units as recited in claim 14 including a first unit and a second unit, each unit having a respective user output device for outputting at least one of video and audio content and being connected to the central server, the central server receiving indications of customer interaction with the first unit and sending responsive control signals to the second unit, the second unit outputting information on its respective user output device in response to the control signals.

17. The system of claim 14, wherein the product interaction data further comprises data indicating each of the respective products in the first set of products that is present on the upper surface.

18. The system of claim 1, wherein the instructions configure the computing system to determine based on images from the product camera when the first product is present on the upper surface and then subsequently removed from the upper surface by:

sending images from the product camera to the product detection module;

receiving output from the product detection module output indicating products from the first set of products that are detected in respective images; and analyzing the output from the product detection module to determine when the first product is present on the upper surface and then subsequently removed from the upper surface.

19. The system of claim 1, wherein the base has a periphery, a plurality of product cameras are mounted to the base along the periphery, each said product camera having a respective field of view that extends over at least a portion of the upper surface of the base, the computing system is further configured to determine location of the first product on the upper surface by using information from at least two of the plurality of product cameras.

20. The system of claim 1, further comprising:

a customer camera mounted to the unit and having a field of view that extends outwardly from the unit to allow images of a person in front of the unit to be captured.

21. The system of claim 20, the computing system further configured to:

identify an attribute of a person shown in an image captured by the customer camera; and generate an output responsive to the attribute of the person.

22. The system of claim 21, wherein the output responsive to the attribute is one of content shown on a video display in communication with the unit and an alert signal sent to a remote device.

23. The system of claim 22, further comprising a facial detection module.

24. The system of claim 23, the computing system further configured to:

send images from the customer camera to the facial detection module; and process output received from the facial detection module to identify the at least one attribute of the customer.

25. The system of claim 23, wherein the facial detection module is in the unit.

26. The system of claim 1, wherein the upper surface of the base further comprises a sensor configured to detect the presence of objects placed on the upper surface.

* * * * *